United States Patent [19]

Cavigelli

[11] Patent Number: 4,794,507
[45] Date of Patent: Dec. 27, 1988

[54] CONTROLLING ELECTRICAL POWER

[75] Inventor: George A. Cavigelli, Lexington, Mass.

[73] Assignee: Doble Engineering Company, Watertown, Mass.

[21] Appl. No.: 132,875

[22] Filed: Dec. 14, 1987

Related U.S. Application Data

[63] Continuation of Ser. No. 034,403, Apr. 3, 1987, abandoned.

[51] Int. Cl.$^4$ .............................................. H02P 13/26
[52] U.S. Cl. ...................................... 363/86; 323/243; 323/300; 323/902
[58] Field of Search ....................... 363/52, 53, 85, 86, 363/87, 126, 63; 323/237, 238, 241, 242, 243, 300, 326, 901, 902

[56] References Cited

U.S. PATENT DOCUMENTS

| | | | |
|---|---|---|---|
| 3,353,082 | 11/1967 | Mellott et al. | 363/86 |
| 3,868,562 | 2/1975 | Marshall | 363/86 |
| 4,376,969 | 3/1983 | Bedard et al. | 323/902 |
| 4,384,259 | 5/1983 | Capewell | 323/902 |
| 4,541,040 | 9/1985 | Allfather | 363/37 |
| 4,686,619 | 8/1987 | Edwards | 363/126 |

Primary Examiner—Peter S. Wong
Attorney, Agent, or Firm—Charles Hieken

[57] ABSTRACT

A power controller includes a full-wave bridge rectifier circuit coupled to an A.C. line by a storage inductor with two windings and a saturating inductor. The output of the bridge rectifier is connected to a D.C. output terminal for producing output voltages for a symmetrical amplifier. The D.C. potential provided by the full-wave rectifier is compared with a ramp signal having an external ramp set point related to the D.C. output potential relative to a reference potential to provide a trigger pulse for controlling the time the SCR is gated on. A balancing system selectively switches auxiliary resistances in and out to maintain a desired balance. Upon sensing a gross imbalance, the SCR is turned off. The power controlling apparatus includes isolation circuitry for creating an isolation barrier having a high frequency path and a low frequency path. The high frequency path includes a transformer having main primary and secondary windings. The transformer also includes an auxiliary primary winding whose output is combined with the signal on the input terminal to provide low frequency spectral components of the input signal that are coupled across the barrier by an electro-optical coupler that energize a low pass filter. The output of the low pass filter is combined with the signal on the secondary of the transformer to provide the isolated output signal. The power amplifier also includes bias control circuitry including a differential amplifier having two transistors with emitters connected together and bases direct coupled to respective emitters of the output Darlington transistors. The respective collectors are direct coupled to respective bases of the output Darlington transistors. A capacitor is connected between the bases of the two transistors.

14 Claims, 19 Drawing Sheets

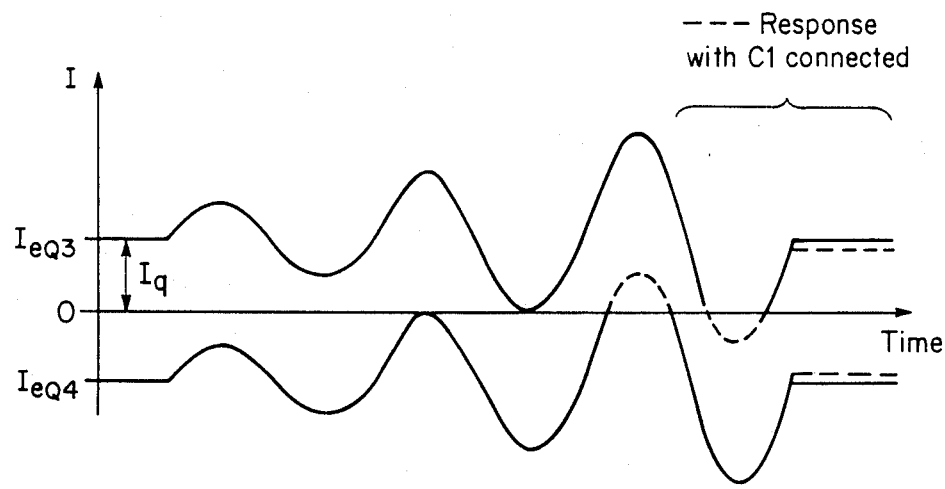
*Fig. 8A*
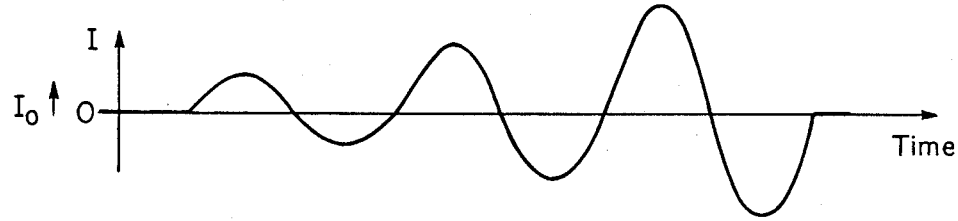
*Fig. 8B*
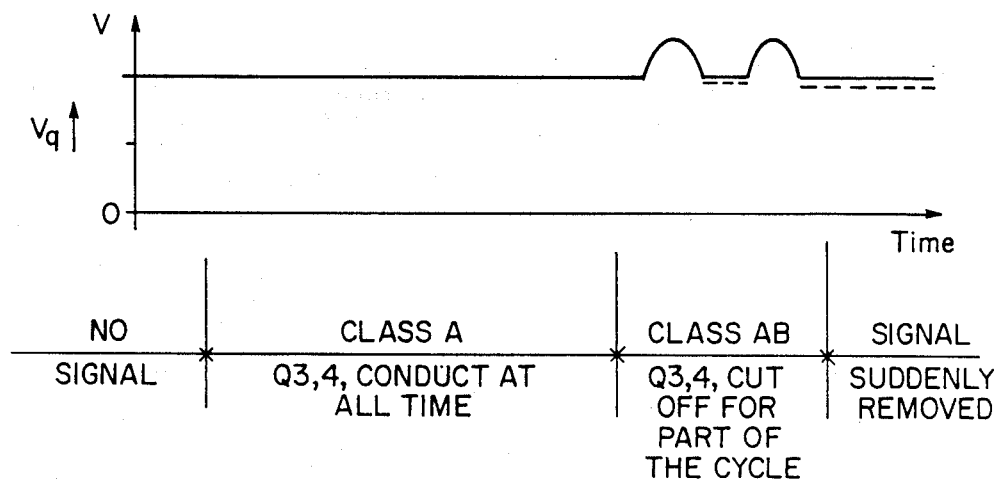
*Fig. 8C*
*Fig 8*

Matching bias of devices operating in parallel. $I_{eq1} = I_{eq3}$ ; $I_{eq2} = I_{eq4}$ BIAS CONTROL CKT;
Modified for applications where out voltage level is equal or less than input voltage level, with:

R = gr
ΔV = 5V
Gain reduction ≈ 10%

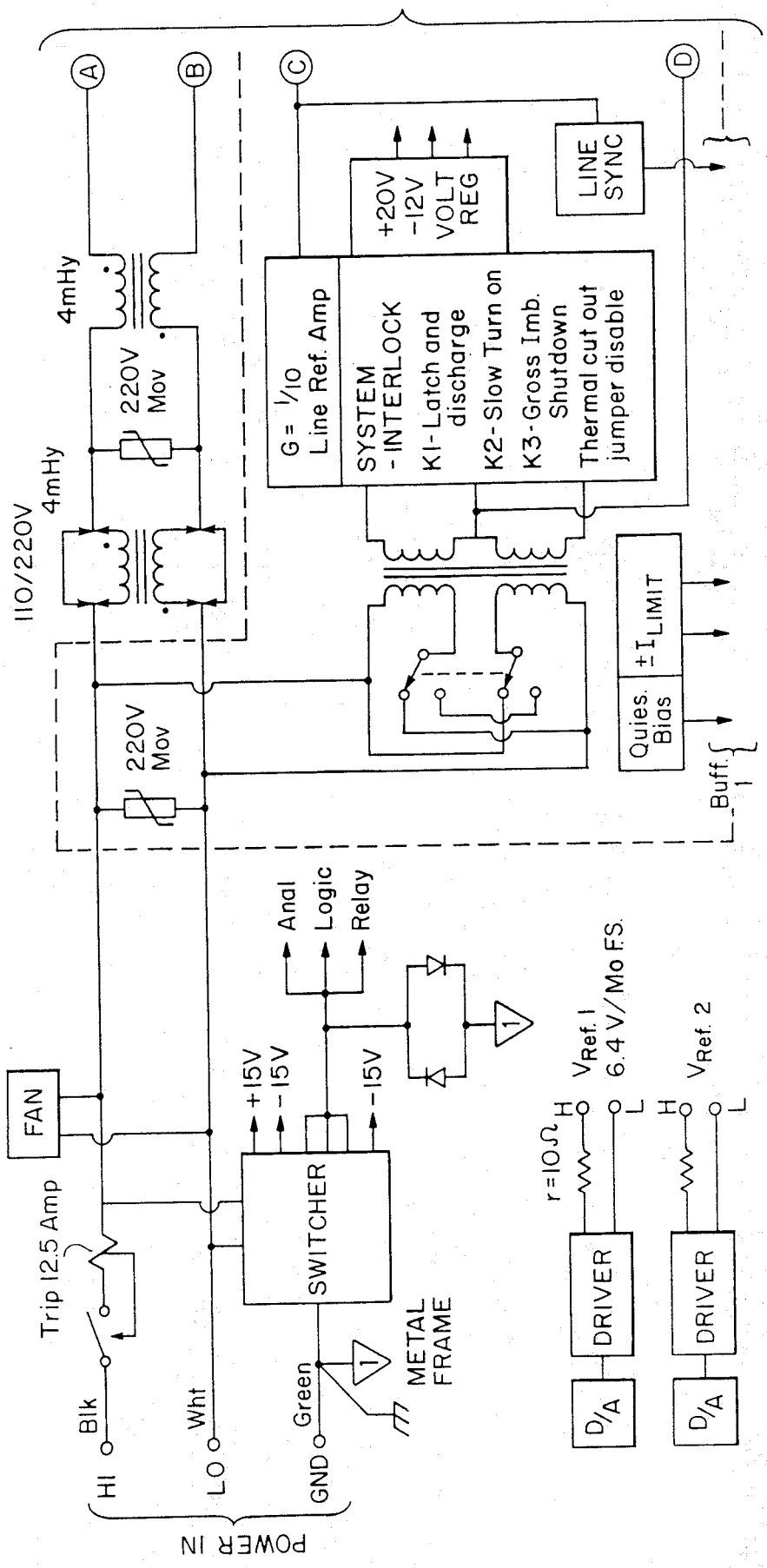
Fig. 13 SHEET 1 OF 5

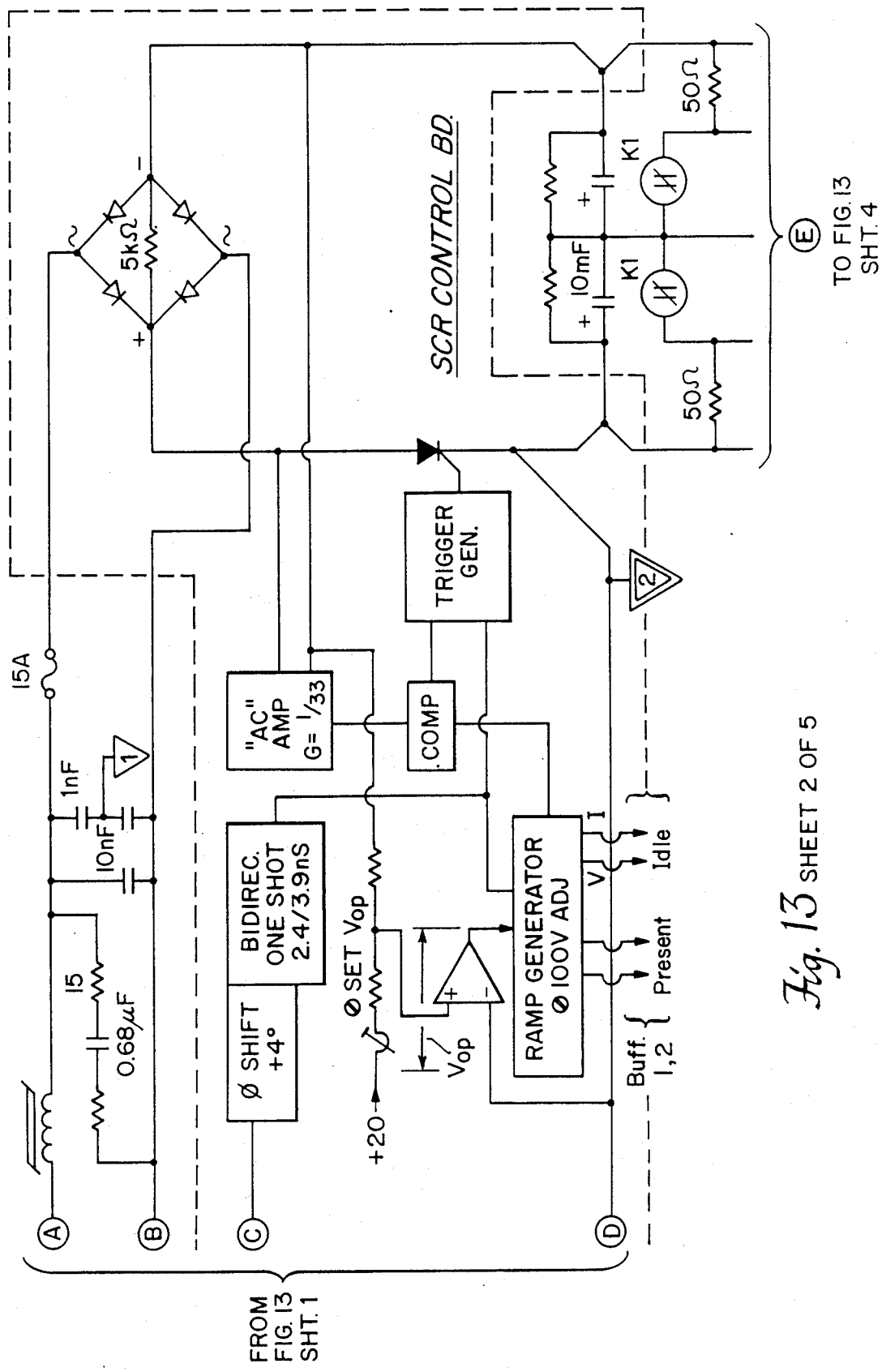
Fig. 13 SHEET 2 OF 5

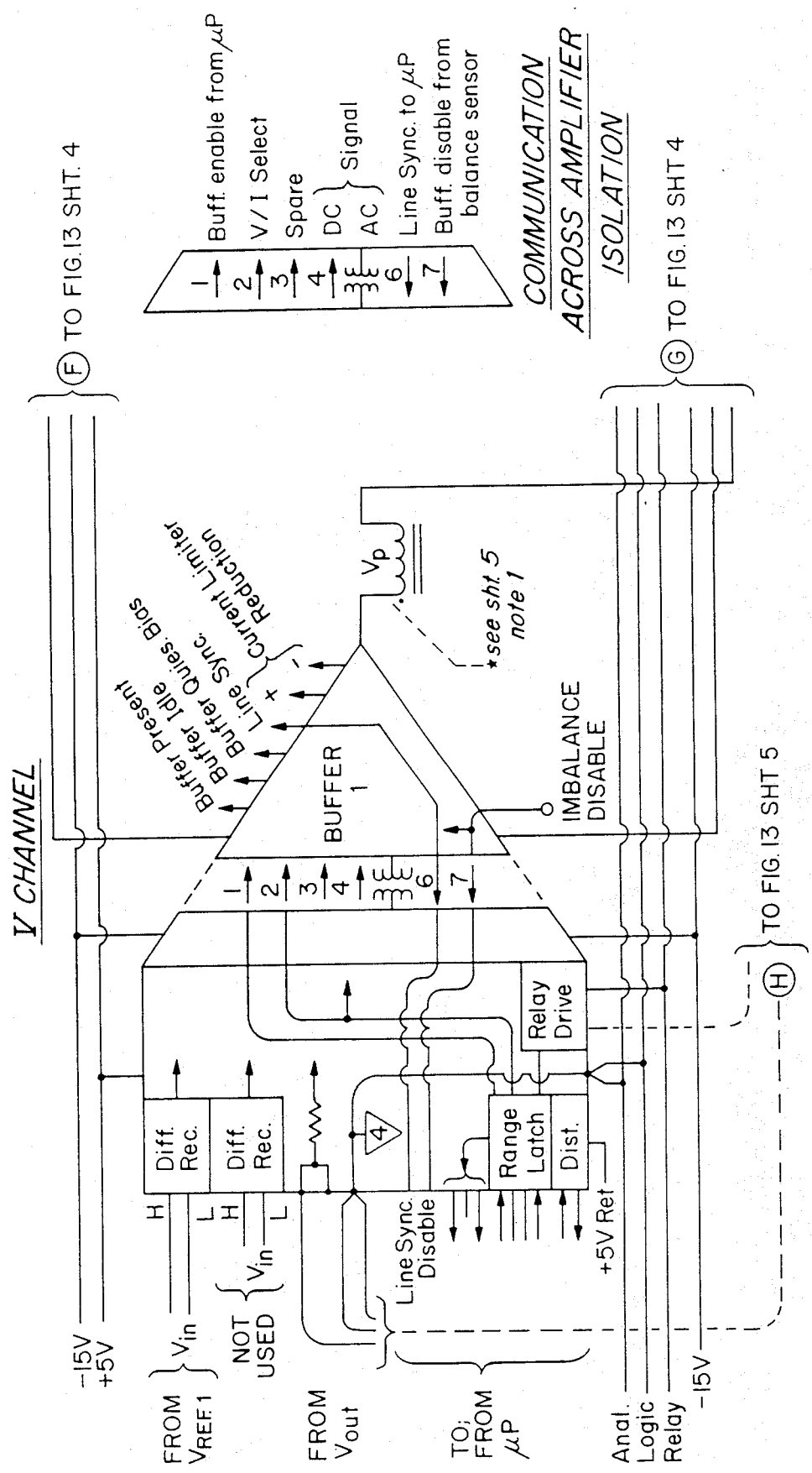
Fig. 13 SHEET 3 OF 5

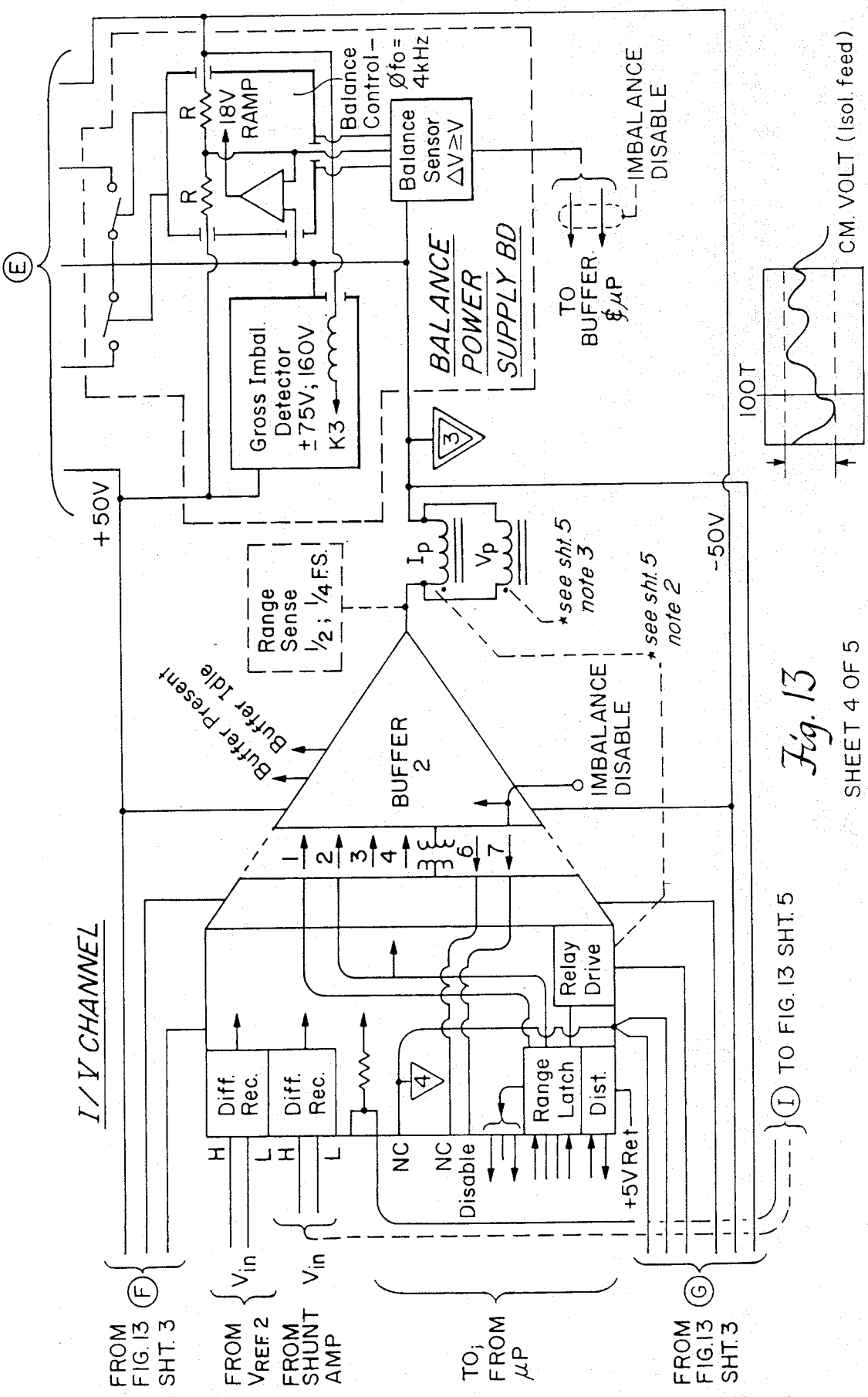
Fig. 13 SHEET 4 OF 5

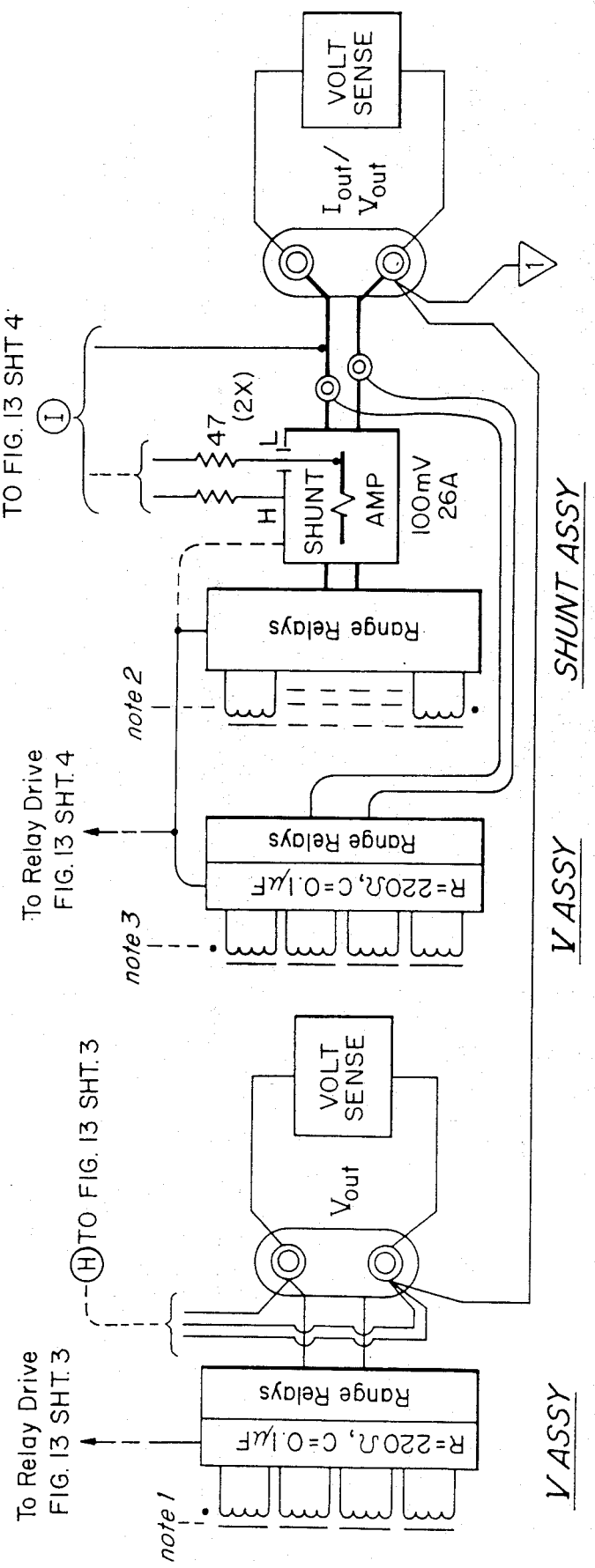
Fig. 13 SHEET 5 OF 5

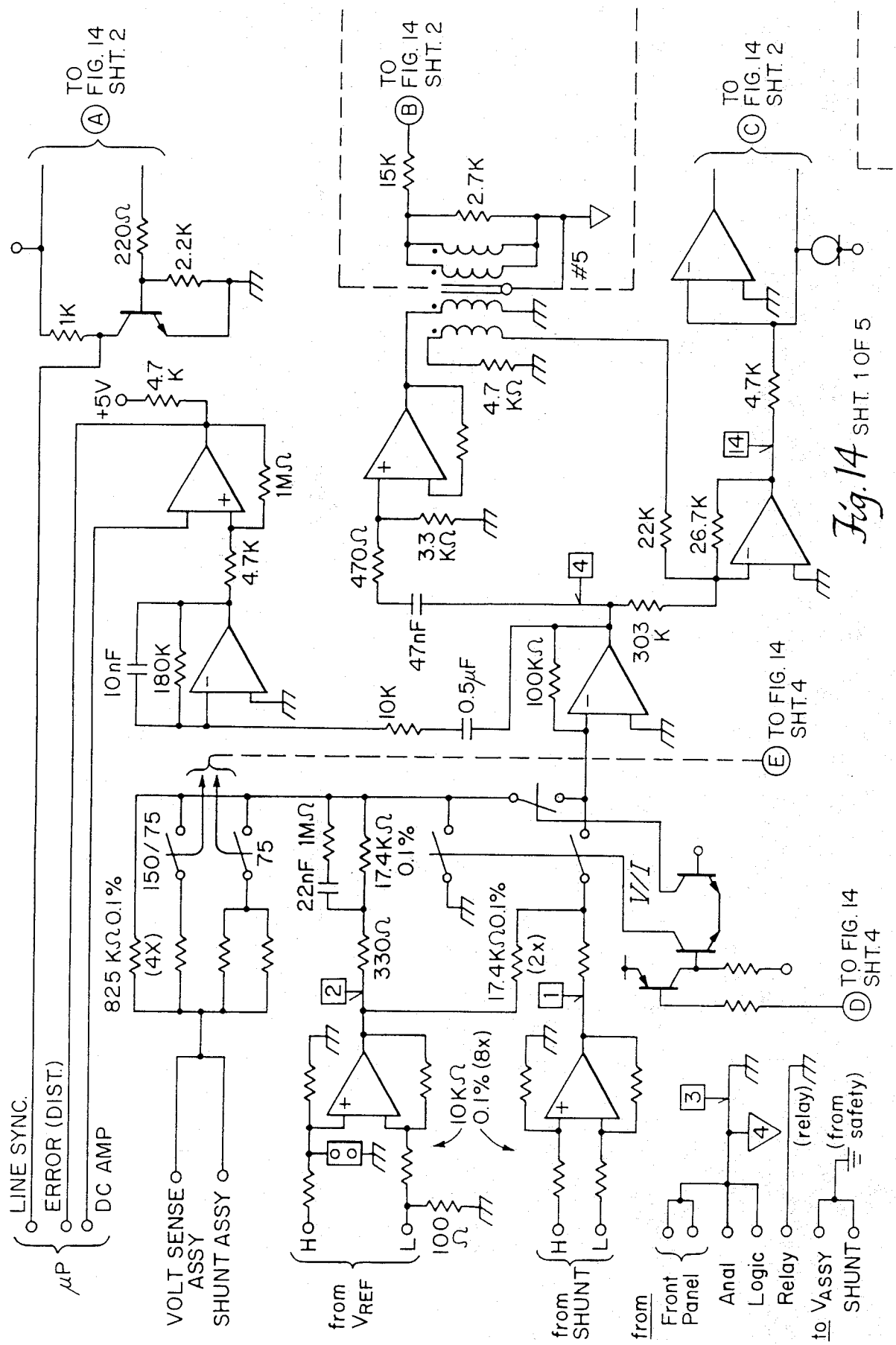
Fig. 14 SHT. 1 OF 5

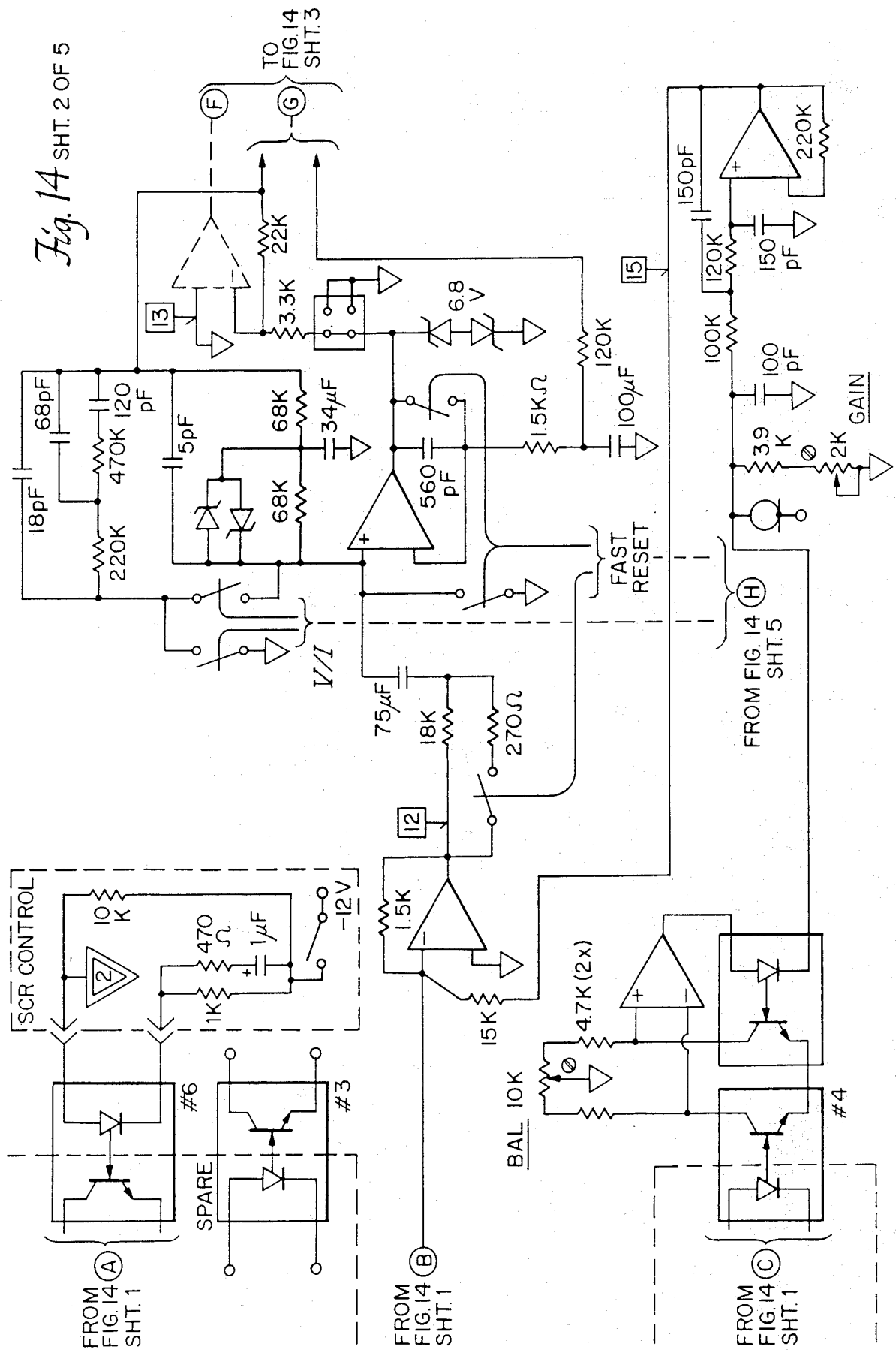

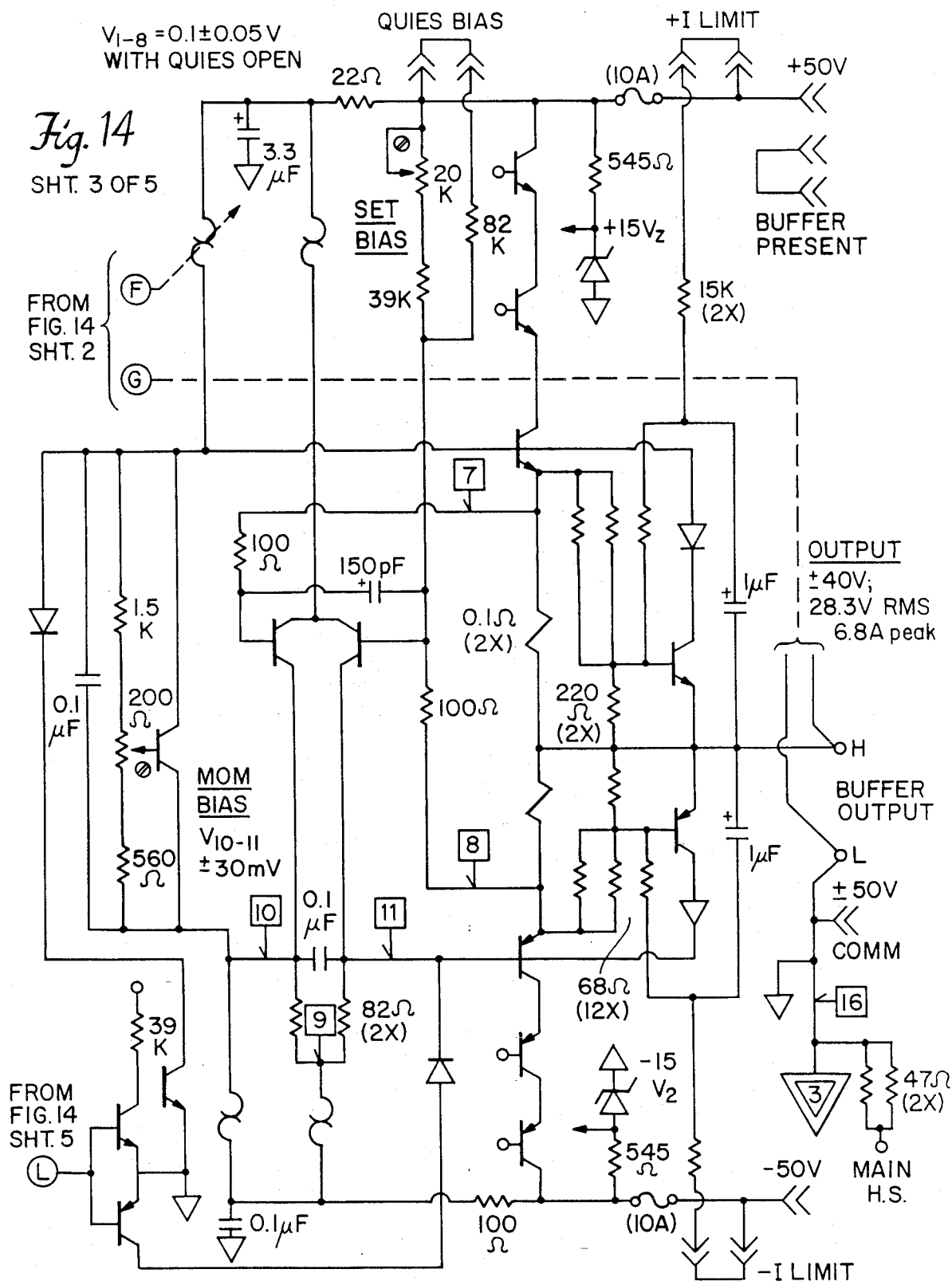

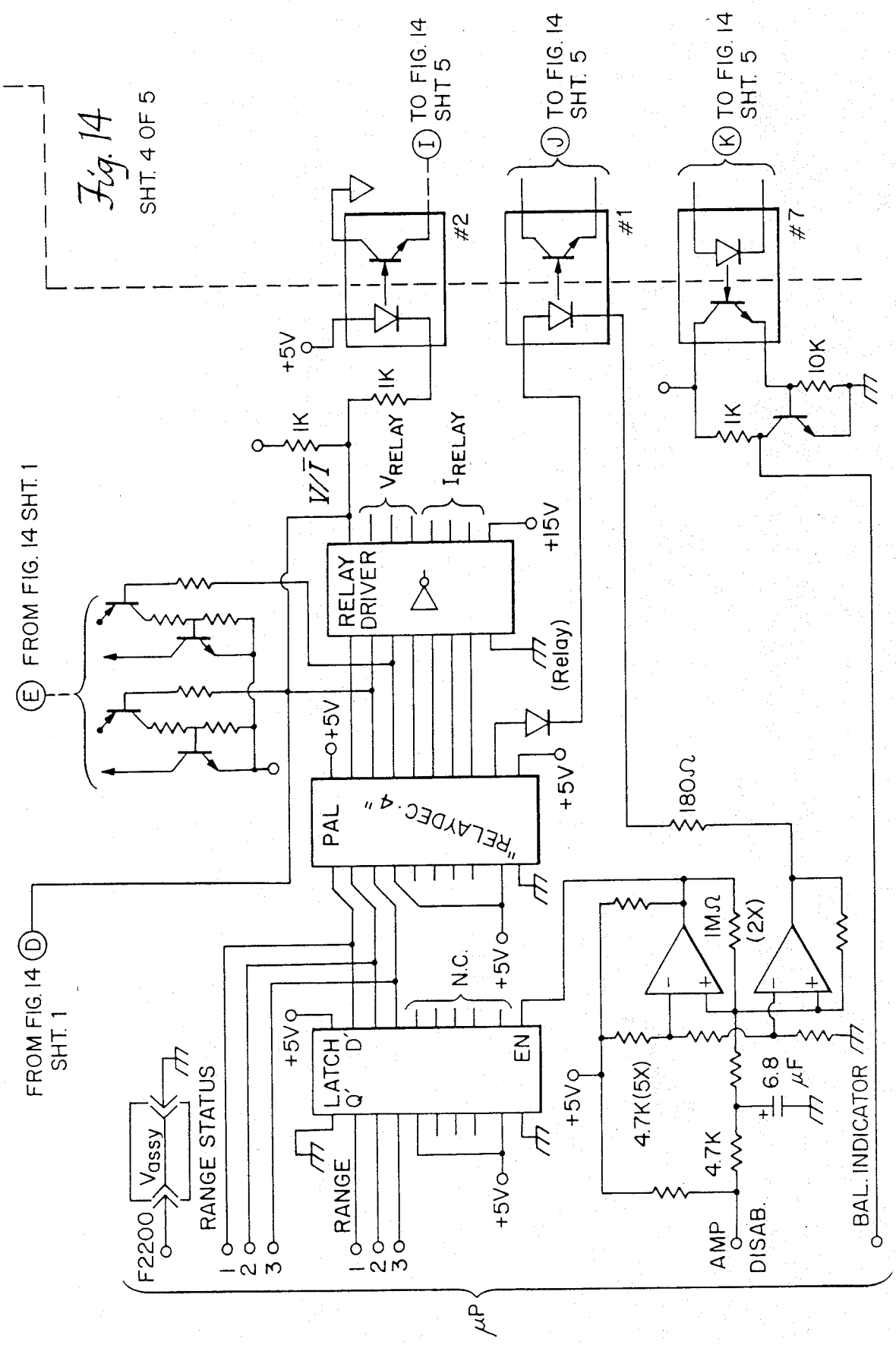
Fig. 14 SHT. 4 OF 5

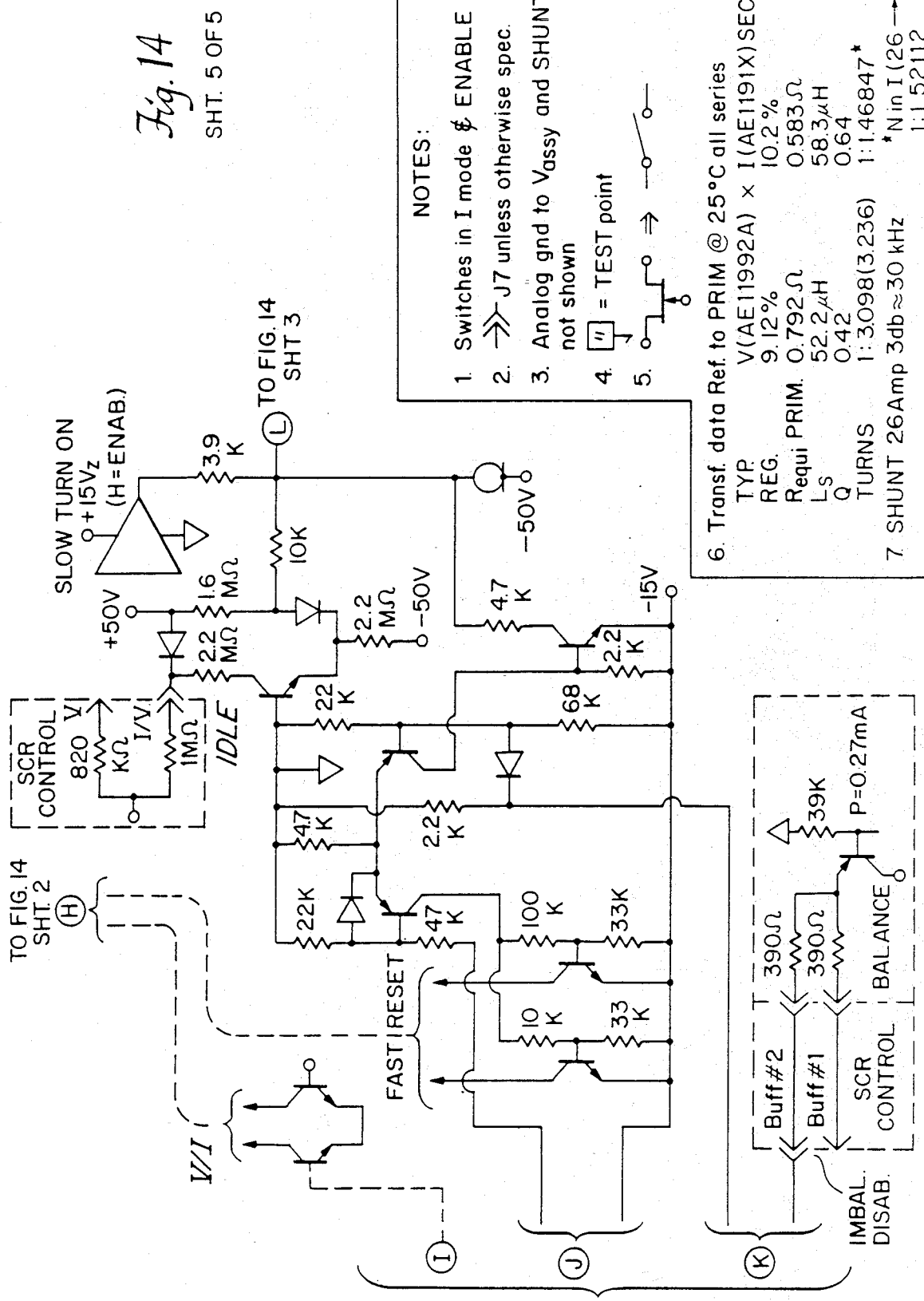

CONTROLLING ELECTRICAL POWER

This application is a continuing application of application Ser. No. 07/034,403 filed Apr. 3, 1987, now abandoned.

The present invention relates in general to controlling electrical power and more particularly concerns novel apparatus and techniques for providing high-accuracy regulated voltage and current sinusoidal waveforms for simulating virtually any power system condition characterized by numerous features. The present invention is embodied in the commercially available F2000 series test systems manufactured and sold by Doble Engineering Company, 85 Walnut Street, Watertown, Mass. 02272.

For background of various aspects of the invention, reference will be made to certain publications below. Where appropriate, differences between the invention and prior art approaches are discussed below in connection with the detailed description of the invention.

It is an important object of the invention to provide improved apparatus and techniques for controlling electrical power. According to the invention, power controlling apparatus includes an A.C. input for receiving A.C. power. There is diode rectifying means for converting A.C. power received on the A.C. input into D.C. power. Inductive storage and a saturable inductor couple the A.C. input to the diode rectifying means. SCR means couple the diode rectifying means to a D.C. output and has a gate electrode. A source of a signal representative of the difference between the D.C. potential on the D.C. output and a reference potential provides an external ramp set point. Means responsive to the external ramp set point provide a ramp signal. There is means for comparing the ramp signal with a signal related to the D.C. potential provided by the diode rectifying means to provide a trigger signal when the potential of the ramp signal and the diode rectifying D.C. potential bear a predetermined value, and means responsive to the trigger signal provide a trigger command to the SCR gate to then initiate conduction. Apparatus of the type just described may provide D.C. potentials of equal magnitude and opposite polarity $+v$ and $-v$ on $\pm v$ and $-v$ lines, respectively, for powering a symmetrical amplifier. There may be first and second balancing resistances of equal value connected between the $+v$ line and the $-v$ line defining a junction potential at their junction, preferably corresponding to ground potential. First and second storage capacitors shunt the first and second balancing resistances respectively. First and second switchable resistances of substantially the same value are connected to the first and second resistances respectively. There is a reference line at reference or ground potential. First and second switching means are connected in series between the reference line and the first and second switchable resistances respectively. Balance sensing means is connected between the junction of the first and second balancing resistances and the reference line for providing a fine imbalance signal to the symmetrical power amplifying means for reducing the imbalance. Comparator means responsive to the signal at the junction between the first and second balancing resistances provides a switch control signal to switch actuating means for controlling the switching means to reduce the imbalance. There may also be gross imbalance sensing means responsive to the signal on the reference line for providing a gross imbalance signal when the sensed imbalance exceeds a predetermined value for providing a turn-off signal to the SCR means for interrupting the flow of D.C. power to the symmetrical power amplifying means.

The symmetrical power amplifying means may include isolation means for establishing an isolation barrier having a voltage thereacross. The isolation means comprises input and output terminals on opposite sides of the isolation barrier, transformer means having a secondary winding, a primary winding and an auxiliary primary winding, and transformer driver amplifying means for coupling spectral components of a signal on the input terminal above a predetermined break frequency to the main primary winding. There is means for cumulatively combining the signal provided by the auxiliary primary winding with the signal on the input terminal for providing a signal having spectral components predominantly below the predetermined break frequency. There is isolating circuit means, such as an electrooptical isolator, for cumulatively combining the latter coupled spectral components with a signal provided by the secondary winding to provide on the output terminal a substantial reproduction of the signal on the input terminal. Preferably, the symmetrical power amplifying means includes first and second semiconductor output devices connected in series between the $+v$ and $-v$ lines each having a pair of electrodes. Biasing control circuit means for establishing the bias across the pair of electrodes includes first and second transistors each having base, emitter and collector electrodes forming a differential amplifier with the emitter electrodes connected together. There is means for direct coupling the base electrodes of the first and second transistors to the first electrodes of the first and second output semiconductor devices, respectively. There is means for direct coupling the collector electrodes of the first and second transistors to the second electrodes of the first and second output semiconductor devices, respectively. Preferably, there is a capacitor connected between the base electrodes of the first and second transistors.

Numerous other features, objects and advantages of the invention will become apparent from the following specification when read in connection with the accompanying drawing in which:

FIGS. 8A, 8B and 8C are graphical representations of pertinent signal waveforms as a function of time helpful in understanding the biasing arrangement;

FIG. 13 is a combined block-schematic circuit diagram of the commercially available F2200 convertible test system incorporating the invention; and FIG. 14 is a predominantly schematic circuit diagram of the I/V channel shown in FIG. 13.

Figure 1:
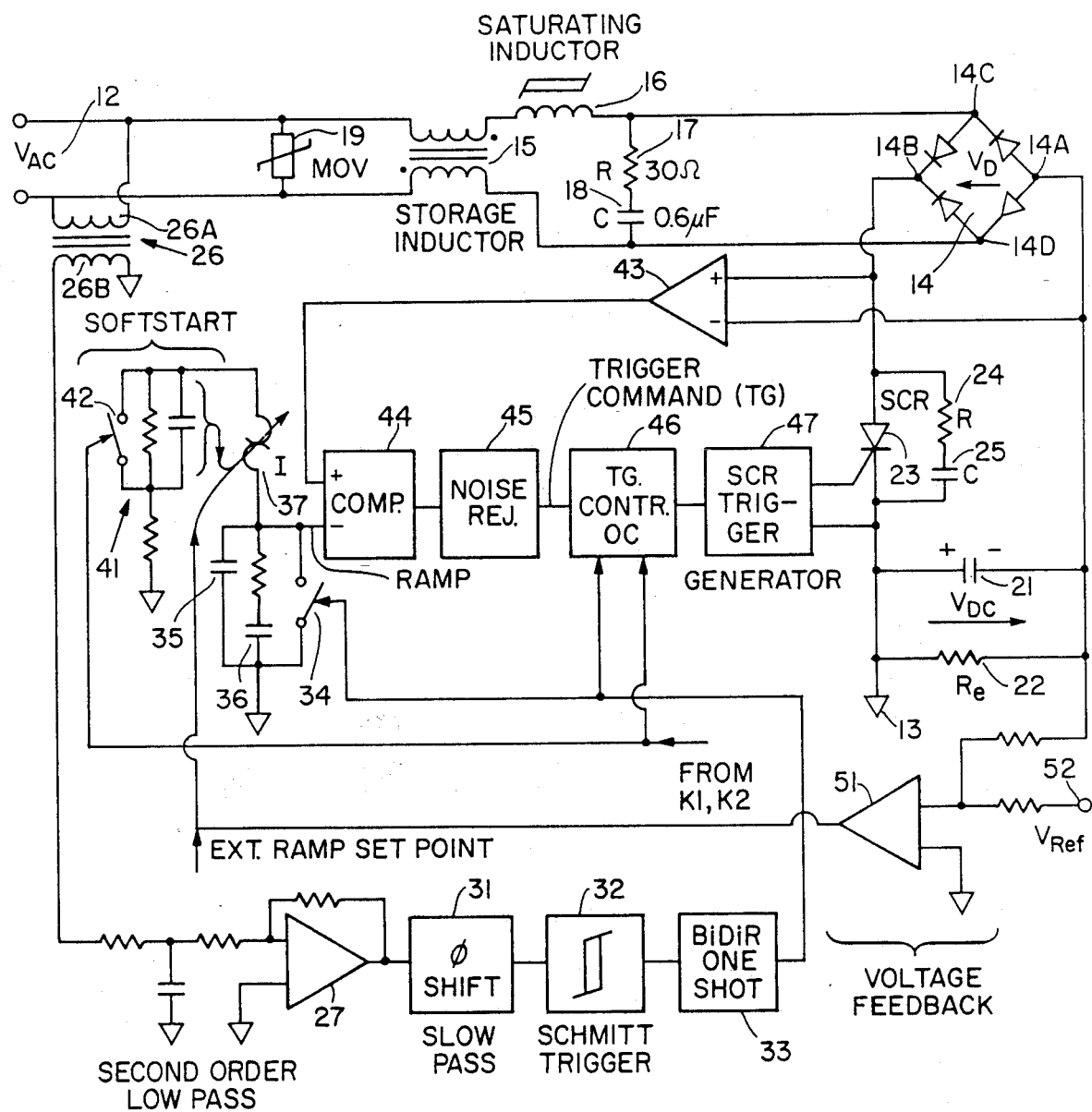
FIG. 1 is a combined block-schematic circuit diagram illustrating the logical arrangement of a D.C. power supply with a regulated SCR according to the invention.

With reference now to the drawings and more particularly FIG. 1 thereof, there is shown a combined block-schematic circuit diagram illustrating the logical arrangement of a system according to the invention. An A.C. signal at input terminals 12 is processed to provide a controlled D.C. voltage at node 14A relative to ground terminal 13. Input terminals 12 are coupled to full-wave diode bridge 14 through storage inductor 15 and saturating inductor 16. Opposed nodes 14C and 14D of bridge 14 are shunted by resistor 17 and capacitor 18. A MOV shunts input terminals 12. The other opposed nodes 14A and 14B of diode bridge 14 are coupled across output capacitor 21 and output resistor 22 with one node coupled to ground terminal 13 through control SCR 23 shunted by the series combination of resistor 24 and capacitor 25.

The A.C. signal on input terminals 12 is also delivered to the primary winding 26A of transformer 26. The secondary winding 26B of transformer 26 is grounded at one end and connected to the input of a second order low pass filter comprising operational amplifier 27. The output of operational amplifier 27 is coupled through phase shift and low pass filter 31 to Schmidt trigger 32. The output of Schmidt trigger 32 is coupled to bidirectional one shot multivibrator 33 whose output selectively closes switch 34 to discharge capacitors 35 and 36 charged through current source 37 enabled by soft start circuitry 41 that is disabled when initially open relay contacts 42 close.

Differential amplifier 43 provides a signal representative of the potential across nodes 14A and 14B of bridge 14 to one input of comparator 44. The other input of comparator 44 receives a ramp signal provided as capacitors 34 and 35 charge. Noise rejection circuitry 45 couples the output of comparator 44 to trigger command control 46 that energizes SCR trigger generator 47 to provide a trigger pulse to the gate electrode of SCR 23.

Amplifier 51 provides a signal related to the potential on node 14A and the reference voltage on reference terminal 52 to provide a ramp set point signal for controlling the current provided by current source 37 in the form of voltage feedback.

Having described the system arrangement, its mode of operation will be described. The phase controlling circuitry keeps the potential $V_{DC}$ constant for a constant output load resistance 22 as the line voltage $V_{AC}$ on input terminal 12 varies. To this end comparator 44 compares the rectified line voltage developed across nodes 14A and 14B to a ramp voltage provided on the inverting input of comparator 44 to turn on SCR 23 when these two potentials are equal. The appropriate slope of the ramp voltage may be determined experimentally in such as way as to keep the output voltage $V_{DC}$ constant over a large range of $V_{AC}$. This control involves a feed forward approach providing control by sensing the deviation and correcting the transfer function accordingly. An important advantage of this approach is high stability with rapid correction immediately upon sensing a disturbance in $V_{DC}$.

Another feature of the invention results in reduced susceptibility to noise on the line by using noise rejection circuitry 45 to delay the output of comparator 44 in such a way that narrow spikes do not trigger SCR 23. Although the maximum amplitude of noise spikes on the line is limited by MOV 19, line dropout, which could cause an early trigger, must last for more than 15 microseconds to reach the SCR trigger generator 47.

Still another feature of the invention resides in inhibiting the ramp and trigger command when not needed. This inhibition period occurs beginning just before the zero crossing and extending to the point where the SCR must be turned on when $V_{AC}$ is low. The zero crossing time of the AC line voltage at input terminals 12 is derived from the signal across secondary winding 26 provided at the output of bidirectional one shot multivibrator 33, which may also be used as a line synchronization signal in other portions of the instrument.

To guarantee, in the worst case, that the SCR trigger command signal is always inhibited at zero crossing, phase shift network 31 advances the line reference provided by operational amplifier 27 by about four degrees before being squared by Schmidt trigger circuit 32 that triggers bidirectional one shot multivibrator 33. The output signal provided by bidirectional one shot multivibrator 33 inhibits the trigger command and holds the ramp reset.

The soft-start turn-on circuitry 41 makes the ramp amplitude very small, causing SCR to begin conduction very late in the cycle, when the power is first turned on, and increasing slowly in each successive cycle. Thus, the circuitry 41 first turns SCR 23 on just before a zero crossing, and in successive cycles, the turn-on time advances until the final value is reached.

Amplifier 51 provides voltage feedback that remains inactive until the output voltage on node 14A is within 80% of its final value. Otherwise, this feedback signal would accelerate the turn-on process and reduce the effectiveness of the soft start circuitry. A large error would exist, which in turn, would create a large ramp signal to correct for the low output voltage. This very narrow range of action for the voltage feedback signal guarantees that its total contribution will always be small compared to the feed forward mode, thereby guaranteeing the stability of the circuitry. Storage inductor 15 functions as a differential and common mode filter inductor to achieve high rejection of lines noise in cooperation with capacitor 20. This circuitry limits the high frequency spectral component of the output voltage on node 14B. MOV device 19 limits the energy of the noise on input terminals 12.

Resistor 24 and capacitor 25 insure the existence of enough current through SCR 23 for latch-on, even when the voltage across SCR 23 is small. Resistor 17 and capacitor 18 also help insure enough current for latch-on in addition to the main purpose of this RC circuit of guaranteeing the SCR 23 opening.

SCR 23 stops conducting when the current, established by the elements connected to it, becomes zero. However, SCR 23 will only block a forward applied voltage after the current has been zero for a sufficient time, $T_q$, typically 50 microseconds, for stored charges inside the SCR junctions to dissipate. This time interval $T_q$ depends on the magnitude of the current flowing and its time derivative as the current approaches zero. A smaller time derivative results in a shorter $T_q$.

The invention includes circuitry to insure that SCR 23 will block a forward applied voltage. As current approaches zero, small saturating inductor 16 exits saturation, and its increased inductance decelerates the rate of change of current. This deceleration reduces $T_q$. This sharp increase in inductance of saturating inductor 16 coupled with the inductance of storage inductor 15 and the RC circuit formed by resistor 17 and capacitor 18 act as a second order low pass filter with controlled Q to decelerate, and thus delay the application of a forward bias to SCR 23. Resistor 17, typically 30 ohms in series with the 0.68 microfarad capacitor 18, controls the Q of the low pass filter, sets a minimum/maximum current value when SCR 23 turns on and reduces the stress on capacitor 18. The small RC circuit formed by resistor 24 and capacitor 25 across SCR 23 guarantees some initial current on turn-on, even if diode bridge 14 has some slow turn-on diodes.

One prior approach used, for example, in a power supply manufactured by Lambda, uses a small inductor inserted after the RC circuit shunting opposed points, such as 14C and 14D of diode bridge 14 and before the SCR anode. The resistance in series with the capacitor is very small, typically 4 ohms in series with a one microfarad capacitor. This circuitry reduces the return of the forward voltage on the SCR effectively, but without an inductor in series with it, the initial current, when the SCR turns on would be too large for the SCR to sustain.

The ramp signal operating point may be modified to accommodate a large range of volt conditions with the least amount of voltage variation. The voltage feedback through the circuitry comprising amplifier 51 will then hold control of the output potential on node 14A at a new current level.

Secondary winding 26B may be center-tapped and provide a voltage limited to ±25 volts by the rectified D.C. voltage, the rectifier diodes (not shown) and the large winding resistance. The winding leakage inductance functions as part of a low pass second order filter. To obtain a good symmetrical signal new zero crossing, amplifier 27 effectively functions as a differential amplifier to amplify the filtered voltage. Phase shift circuit 31 shifts the phase by four degrees at 50/60 Hz and has low-pass characteristics to provide roll of at higher frequencies. Schmidt trigger 32 squares this clamped, filter, phase-shifted line voltage. The resulting square wave triggers bidirectional one shot 33; that is, one shot 33 switches on both negative and positive transitions of the input square wave. The output of one shot 33 goes high just before the A.C. line zero crossing at input terminals 12, and remains high for about 2.4 and 4.0 milliseconds for 60 and 50 Hz, respectively. This signal resets the ramp and inhibits the SCR trigger command to SCR trigger generator 47.

SCR trigger generator 47 may comprise a PUT used to discharge a capacitor into the gate electrode of SCR 23. Discharge begins when the PUT gate goes negative. A PUT is a very cost effective way of generating a short current pulse of large amplitude by discharging a capacitor.

Preferably the power supply includes interlock relays (not shown in FIG. 1). Turning on the power supply energizes a relay K1 through a normally closed contact of a second relay K2 and holds on through a normally closed contact of a third relay K3. Relay K2 in turn operates and leaves relay K1 ready to open, if K3 becomes temporarily energized. If relay K1 opens, it can only be reset by first turning the power off, then on again. Relay K3 can be temporarily energized by a large power supply imbalance or some temperature sensor. The power supply may also include a jumper in series with a temperature activated switch for disabling the supply, but only temporarily while the +20 volt supply is inoperative. The jumper may be used while servicing the instrument, and the temperature sensing switch may function to prevent operation of the instrument while the internal temperature is temporarily excessive.

When power is off and relay K1 released, two of its normally closed contacts connect a discharging resistance across storage capacitors, such as 34 and 35 and the one in soft-start circuit 21. This feature insures rapid dissipation of the stored energy and prevents long-lasting output amplifier transients which could damage equipment under test connected to output terminal 23.

Figure 2:
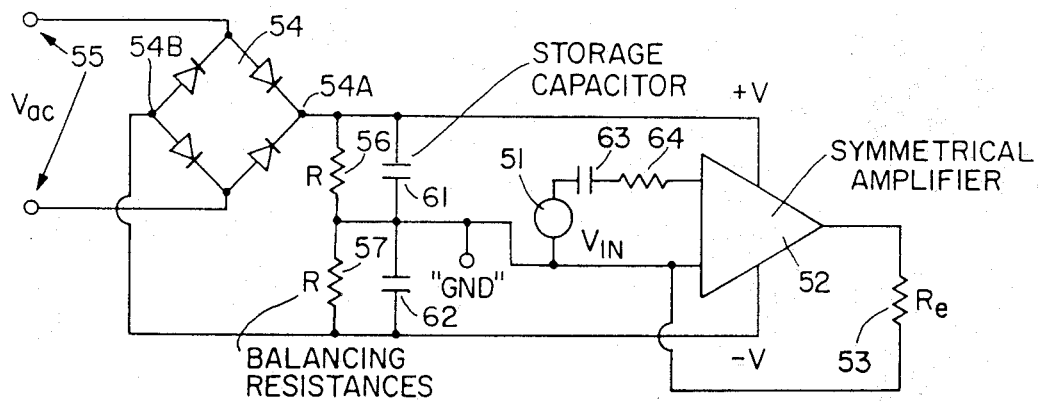
FIG. 2 is a combined block-schematic circuit diagram illustrating the principles of a balanced amplifier according to the invention.

With reference now to FIG. 2, there is shown a combined block-schematic circuit diagram of a balanced amplifying system according to the invention. An input signal from source 51 is amplified by symmetrical amplifier 52 to provide an amplified signal across output resistance 53. Symmetrical amplifier 52 receives equal and opposite D.C. potentials $+v$ and $-v$ provided by fullwave rectifying bridge 54 rectifying the A.C. input signal across input terminals 55. Balancing resistances 56 and 57 are connected across opposed nodes 54A and 54B. Storage capacitors 61 and 62 shunt balancing resistances 56 and 57, respectively. The signal output of signal source 51 is coupled to the ungrounded input of symmetrical amplifier 52 by capacitor 63 and resistor 64. The grounded input of symmetrical amplifier 52 is connected to the grounded end of load resistance 53, signal source 51 and the junction of the balancing resistances 56 and 57 and the storage capacitor 61 and 62.

Having described the circuit structure, its mode of operation will be described. There are problems in creating a power supply center point or circuit ground for a power amplifier receiving D.C. operating potentials from an unbalanced voltage source, as desired by rectification of line voltage, for example. If the amplifier need not supply D.C. current to the load, the circuit of FIG. 2 may be used with equal resistances 56 and 57 of value R establishing ground potential half way between $+v$ and $-v$. Balancing resistances 56 and 57 preferably carry enough current to somewhat compensate for any small imbalance in the capacitors leakage currents and the amplifier asymmetric current drain from the $+v$ and $-v$ potential sources, and any small D.C. current through the load $R_L$. This current produces some additional power dissipation, and any accidental transient in the signal will create large imbalance in the supply.

According to the invention, the basic approach of the circuit of FIG. 2 works, even when the amplifier must supply large amounts of power. Consider redefining the problem. If the load presented to amplifier 52 is the primary of an output transformer, the long-term D.C. output current should be kept low to prevent saturation and reduction of power handling capacity. The amplifier will not present a symmetrical load to the D.C. power supply. Some ill-defined transient will create shortturn asymmetric current drain on the power supply, for example driving the transformer primary into saturation when the signal is first applied. Some unforeseen transients or component failure will create a very large imbalance or even a complete short circuit between the output and one of the supply lines.

Figure 3:
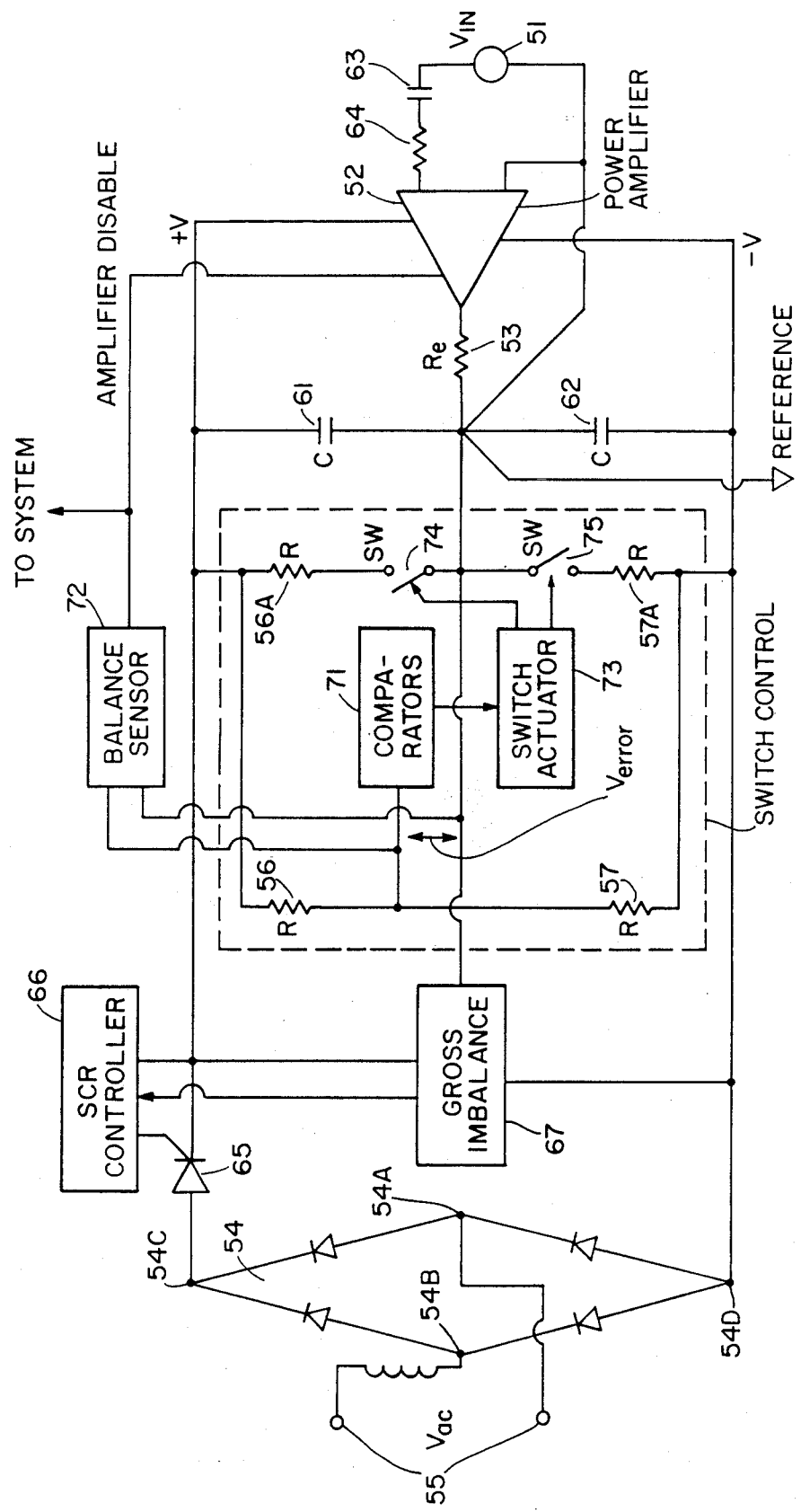
FIG. 3 is a combined block-schematic circuit diagram of a power supply balancing system according to the invention.

Referring to FIG. 3, there is shown a combined block-schematic circuit diagram of an embodiment of the invention for avoiding these problems. The power supply balancing system includes SCR 65 connected between node 54C of full-wave rectifier bridge 54 and the +v line to power amplifier 52. The output of SCR controller 66 is connected to the gate of SCR 65 and its input connected to the output of gross imbalance detector 67 having inputs connected to the +v and −v lines and reference line 70. Comparator 71 has its input connected to the junction of resistors 56 and 57. Balance sensor 72 has its input connected between the latter junction and reference line 70 at reference potential. The output of balance sensor 72 is coupled on line 72A to power amplifier 52 and to other portions of the system. The output of comparator 71 is connected to switch actuator 73 to control the opening and closing of switches 74 and 75 connected to reference line 70 and resistors 56A and 57A, respectively.

Having described the structural arrangement of the power supply balancing system of FIG. 3, its mode of operation will be discussed. Comparator 71 senses any imbalance of ±v with respect to the reference potential on reference line 70. The balance is restored by switching the appropriate ones of resistors 56A and 57A on and off with the proper duty cycle to simulate any value of resistance from ∞ to r. When balance sensor 72 detects a level of imbalance larger than a predetermined value, power amplifier 52 is disabled, thereby preventing the flow of any further asymmetric load current through load resistance 53. Balance sensor 72 also provides a signal to the system to indicate that the input signal to the amplifier is not being processed, and to initialize a new signal turnon cycle. With the large imbalance from power amplifier 52 removed, the balancing circuit can, in a very short time, restore the normal operating conditions, power amplifier 52 may be re-enabled, and input signal from source 51 reapplied to the input of power amplifier 52.

If the above cycle does not restore the proper balance because of some catastrophic failure, then a secondary circuit comprising gross imbalance detector 67 provides a signal to SCR controller 66, disabling SCR 65 and discontinuing power to power amplifier 52. The power can only be restored by turning the main switch off, and then on again.

Sources of imbalance may be classified as (1) small D.C. asymmetries in the amplifier, (2) ripples on the filter capacitors caused by load current, (3) large asymmetric load current transients ... transformer magnetizing currents, and (4) large, long-lasting currents caused by component failure.

For optimum performance from the standpoint of power dissipation, weight, cost and product performance, the following criteria may be applied: for (1) and (2), power amplifier 52 can operate with a small steady imbalance, and the balancing circuit should not try to reduce the ripple across the filter capacitor caused by the load current. This reduction would only waste power. If the ripple across capacitor 61 or 62 is too large, it is more effective to increase the size of the capacitors. In case (3) the full capacity of the circuit should be used to restore the balance, and if this is insufficient, without much delay, depending on the amount of error, power amplifier 52 should be temporarily disabled. In case (4) the power supply should be disabled within a reasonable time.

Figure 4A:
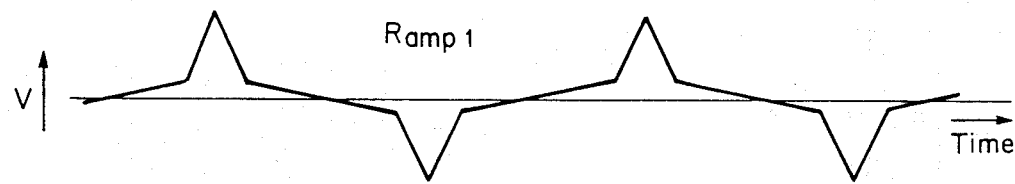
FIGS. 4A and 4B are graphical representations of ramp waveforms plotted to a common time scale helpful in understanding principles of the invention.
Figure 4B:
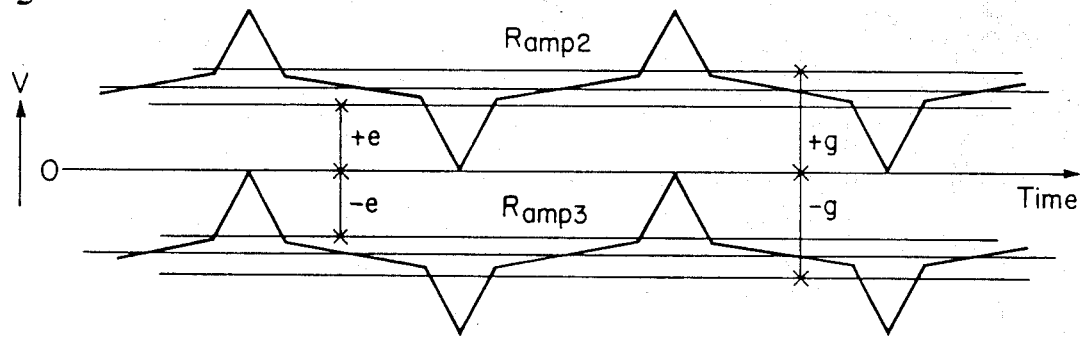

To effect these results, the apparatus develops a switch control signal having the character shown in FIG. 4A. This signal is split into two signals, one above, and the other below zero as shown in FIG. 4B. The error signal at the input of comparator 71 is then compared with the signals designated ramp #2 and #3 shown in FIG. 4B. The output from comparator 71 resulting from this comparison controls switch actuator 73 to operate switches 74 and 75 to time the switching of resistances 56A and 57A. For a small error, e, the "on" time of either switch 74 or switch 75 has a small duty cycle corresponding to a small gain. The error band ±e corresponds to cases (1) and (2).

When the error gets larger than e, but less than g, the duty cycle increases very rapidly, providing a large amount of correction. This correction will hold the error within this boundary if the instrument is used appropriately. If and when the error goes beyond the limit g, where the imbalance is large and switching resistances 56A and 57A cannot compensate for it, or the supply cannot deliver enough current, then quickly the error can grow and in turn trip the amplifier disable circuit comprising balance sensor 72. Now all normal sources of imbalance are removed, and the balance is restored.

Balance sensor 72 comprises two voltage comparators. One has an inverted output, and their combined outputs are connected to an integrating capacitor followed by a Schmidt trigger. The Schmidt trigger has a timing capacitor to decelerate its reset. The output of this circuit drives the amplifier disable circuit and a logic line to the system controller.

Gross imbalance circuitry 67 may comprise a simple Zener diode circuit that senses the voltage from a reference terminal to the +v and −v lines, and if the potential on either of these lines exceeds some predetermined value, a relay K3 is energized. Energizing relay K3 releases relay K1 that was set when the power was turned on (see FIG. 1). Releasing relay K1 disables the trigger command to SCR 65 and also discharges filter capacitors 61 and 62 through resistors 56A and 57A. These resistances are typically 50 watt resistors that quickly discharge capacitors 61 and 62 when the instrument is turned off. This feature provides a clean and safe shutoff of all power amplifiers before the instrument controller sends out erratic signals that could damage the equipment under test or create hazardous conditions to a casual user of the equipment.

An example of a low power balancing circuit may be found in FIG. 2 of the Model 264108 Dura-Vue II scope schematic diagram, 264108-798.

Figure 5:
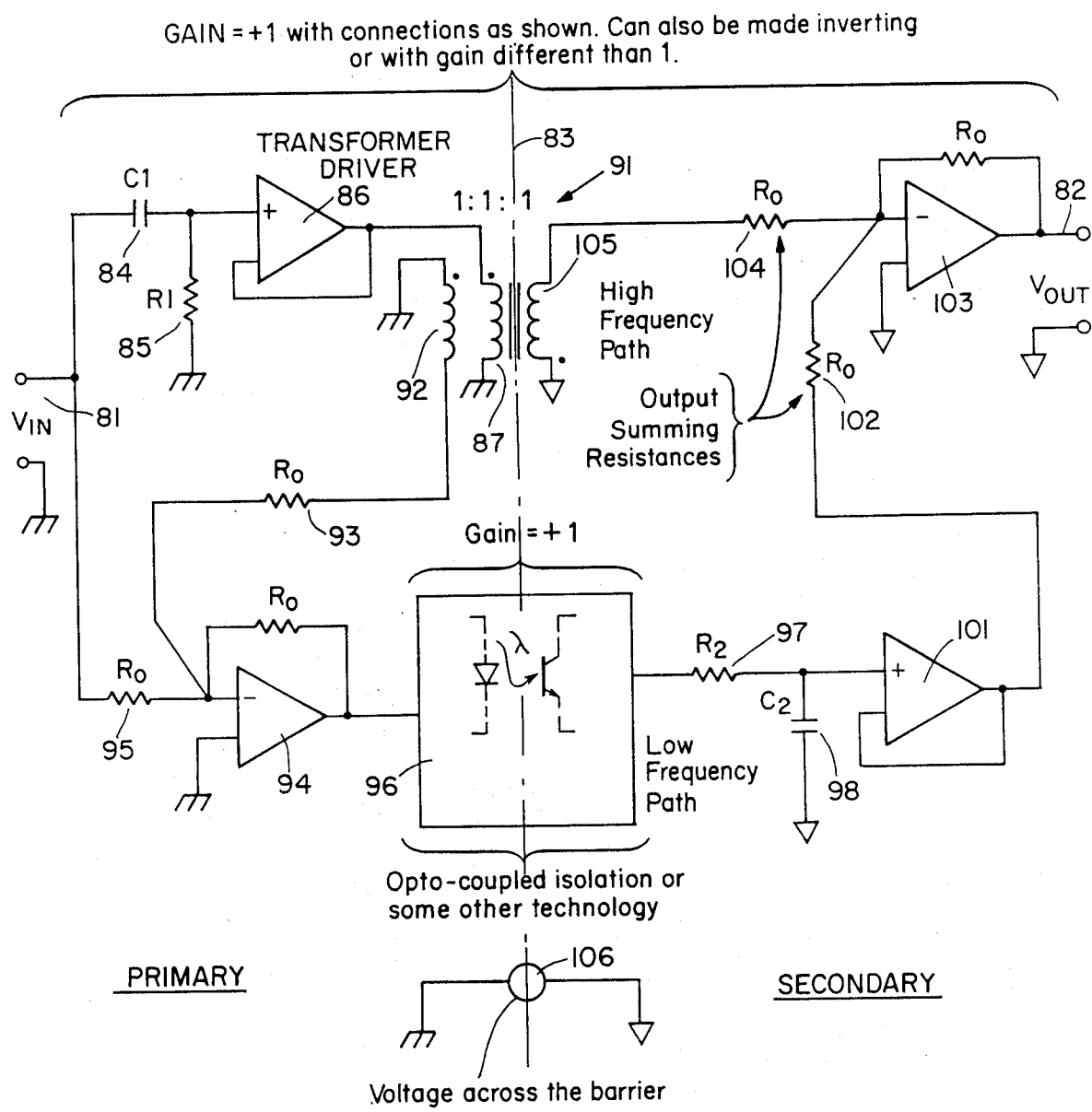
FIG. 5 is a combined block-schematic circuit diagram illustrating the logical arrangement of an isolation amplifier according to the invention.

Referring to FIG. 5, there is shown a combined block-schematic circuit diagram of an isolation power amplifier according to the invention. This circuitry represents an improvement of the system shown in FIG. 2 of U.S. Pat. No. 4,541,040 entitled POWER CONVERTING of Lars P. Allfather granted Sept. 10, 1985, and owned by the assignee of this application. An input signal applied to terminal 81 is coupled by parallel paths to output terminal 82 with unity gain while isolating terminal 81 from terminal 82 across barrier 83.

A high pass filter comprising capacitor 84 and resistor 85 couple input terminal 81 to transformer driver 86 connected to main primary winding 87 of transformer 91 having an auxiliary primary winding 92 grounded at one end and connected through resistor 93 to the inverting input of operational amplifier 94. This input is also connected to input terminal 81 through resistor 95. Operational amplifier 94 drives optoisolator 96 to couple low frequency components of the input signal across isolation barrier 83. A low pass filter comprising resistor 97 and capacitor 98 couples the output of opto-isolator 96 to the noninverting input of operational amplifier 101. Resistor 102 couples the output of amplifier 101 to the inverting input of output operational amplifier 103. Resistor 104 also couples this inverting input to output winding 105 of transformer 91. The voltage across the isolation barrier 83 between the ground potential at the left and the ground potential at the right is represented by voltage source 106.

Having described the physical arrangement of the isolation amplifier, its mode of operation will be described. In power amplifiers, where the output stage common is connected to the power line, an isolation amplifier is needed to couple the signal from the local ground to the line potential. The isolation amplifier bandwidth must be great enough to transmit the spectral components amplified by the amplifier. When the amplifier is powered by an SCR regulator, the voltage across the isolation amplifier barrier 83 is a combination of the line voltage, and a 100-volt high transient, with a rise time of 100 volts per microsecond. This transient repetition rate is at twice the line frequency.

In a specific embodiment of the invention the isolation amplifier has a bandwidth of a few MHz, and/or a maximum phase shift of a few degrees at 100 kHz. No commercially available isolation amplifier was known offering this broad bandwidth with little phase shift combined with an adequate isolation mode rejection ratio (IMRR). According to the invention, as in the aforesaid patent, high frequency and low frequency spectral components of the input signal pass over parallel paths across isolation barrier 83. Isolation transformer 91 and opto-coupler 96 couple high and low frequency spectral components, respectively, across isolation barrier 83.

While opto-coupler 96 is an analog device, it is within the principles of the invention to use other isolation techniques, such as digital techniques, which might involve transmitting a sequence of digital signals across a transformer, or modulation techniques which might involve modulating the frequency of an oscillator with the low frequency spectral components, transmitting the modulated signal across the barrier through a transformer and applying the frequency modulated signal at the output of the transformer to a discriminator or other f-m detector.

The high frequency spectral components from input terminal 81 are A.C. coupled to the main primary winding 87. Auxiliary primary winding 92 senses the flux in the core of transformer 91 to derive a signal representative of the voltage induced in secondary winding 105. The difference between this signal and the input signal resulting from combining this signal with the input signal with the adding network comprising resistors 93 and 95 is the low frequency spectral components of the signal applied at the inverting input operational amplifier 94. Resistors 104 and 102 then form a combining network for combining the isolated low and high frequency spectral components at the inverting input of output operational amplifier 103.

This arrangement has a number of advantages. No critical component is required for separating spectral components in the input signal on the primary side. On the secondary side, the two resistors 102 and 104 add the low and high frequency spectral components to recover the original input signal. The circuit cancels any voltage induced in the transformer winding by an external magnetic field from nearby 60 Hz magnetic components. Such a voltage would be equal and opposite in magnitude as it reaches the output summing resistances 102 and 104. Any nonlinearity in coupling transformer 91 is also canceled. The transformer construction may be such that the distance between the primary and the secondary windings guarantees a large breakdown potential. For example, the primary windings 87 and 92 and secondary winding 105 may be placed side-by-side with a barrier between them. The high frequency bandwidth, limited by transformer 91, is typically 3 MHz. The IMRR at 100 kHz, through the channel including transformer 91 is typically 92 dB and no less than 80 dB, which improves as the frequency decreases at a rate of 40 dB/decade. The turns ratio of transformer 91 completely determines the gain through the high frequency channel and is very stable. The slew rate of the isolation amplifier, when the frequency division is optimum, is only limited by the operational amplifier 86 and 103 used in the high frequency channel. The low frequency channel limits the IMRR. The low pass filter comprising resistor 97 and capacitor 98 helps reduce the effect of fast transients capacitively coupled into opto-isolator 96. As the cutoff frequency of this low pass filter approaches the upper limit frequency of the low frequency path, the overall frequency response after summing in summing resistors 102 and 104 becomes less flat.

Low frequency transmission through transformer 91 is limited by its volts/second capacity. Capacitively coupling input terminal 81 to transformer driver 86 through capacitor 84 helps prevent overloading transformer 91 and driving it into saturation. As the bandwidth of the low frequency channel is reduced, it is easier to transmit the low frequency spectral components with good IMRR, either as an analog signal with a lower break frequency for the low pass filter comprising resistor 97 and capacitor 98, or as a modulated signal, where the modulation does not have to be at a very high frequency, and inexpensive techniques may be used. For background information, reference is made to OPTOELECTRONICS second edit. (Hewlett-Packard 1981) pp. 3.35-3.36, an article by Greg Smith entitled "Hybrid Isolation Amps Zap Price and Voltage Barriers" in ELECTRONIC DESIGN for Dec. 11, 1986, beginning at page 91, an article by G. Gaggini et al. entitled "Isolation Amplifier with Combined Magnetic and Optical Coupling" in IEEE TRANSACTIONS ON INSTRUMENTATION AND MEASUREMENT, Vol. 24, No. 2, June 1975, pp. 115-17, and a data sheet entitled "Isolation Amplifiers of Analog Devices of Norwood, Mass., describing 290A, 292A and AD293, AD294 and AD295 isolation amplifier.

Figure 6:
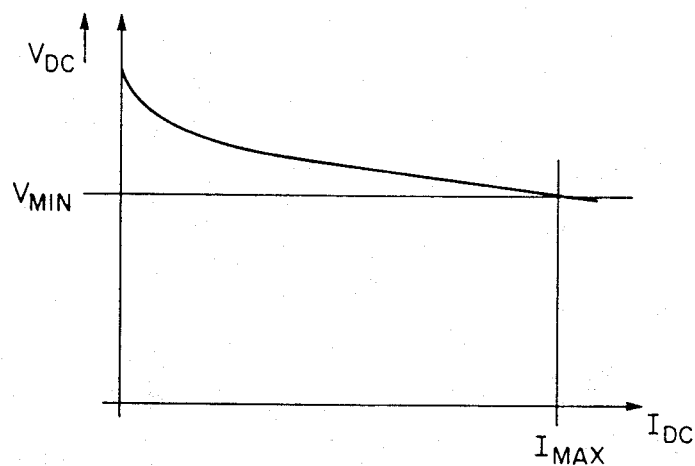
FIG. 6 is a graphical representation of D.C. voltage as a function of D.C. load current.

Referring to FIG. 6, there is shown the output current-voltage relationship of amplifier supply voltage when operated on an unregulated supply. When power amplifiers are operated on an unregulated supply, the supply voltage varies significantly as the current through the load changes. For background reference is made to the MOSPOWER Applications Handbook of Siliconix Inc., pp. 5-9 to 5-14; 5-15 to 5-32; 6-97 to 6-104; and 6-105 to 6-110, to Kepco Currents, Vol. 1, No. 2, pp. 2-3 and an article of Robert R. Cordell entitled "A MOSFET Power Amplifier with Error Correction" presented at the Audio Engineering Society, Anaheim, Calif., in October 1982.

In class B or C, the quiescent current in the output power amplifier stage is 0. The class B arrangement minimized power dissipation when crossover distortion is not important. In class C, the bias offers the same power economy as class B. It is also easier to implement, avoiding the delicate circuit balance needed to prevent operating in class AB for some combinations of load and ambient temperature, and the risk of a thermal runaway.

In many applications where the output stage is operated in class AB; that is, with a small quiescent current, the biasing arrangement must thermally track the output devices, a difficult task. Pages 4 and 6 and FIG. 4 of the latter paper providing some information on this subject. With class C bias, crossover distortion is not a problem in many industrial applications.

With a class A output stage the current drain on the supply would be constant, but the power dissipation would increase with increasing signal. Operation in class AB would provide some improvement with only a small increase in dissipation.

The problem of the supply voltage increase is magnified when more than one amplifier is operated on the same supply. When all but one of the amplifiers is idle, the one amplifier still driving a load will dissipate extra power because of the high supply voltage.

Figure 7:
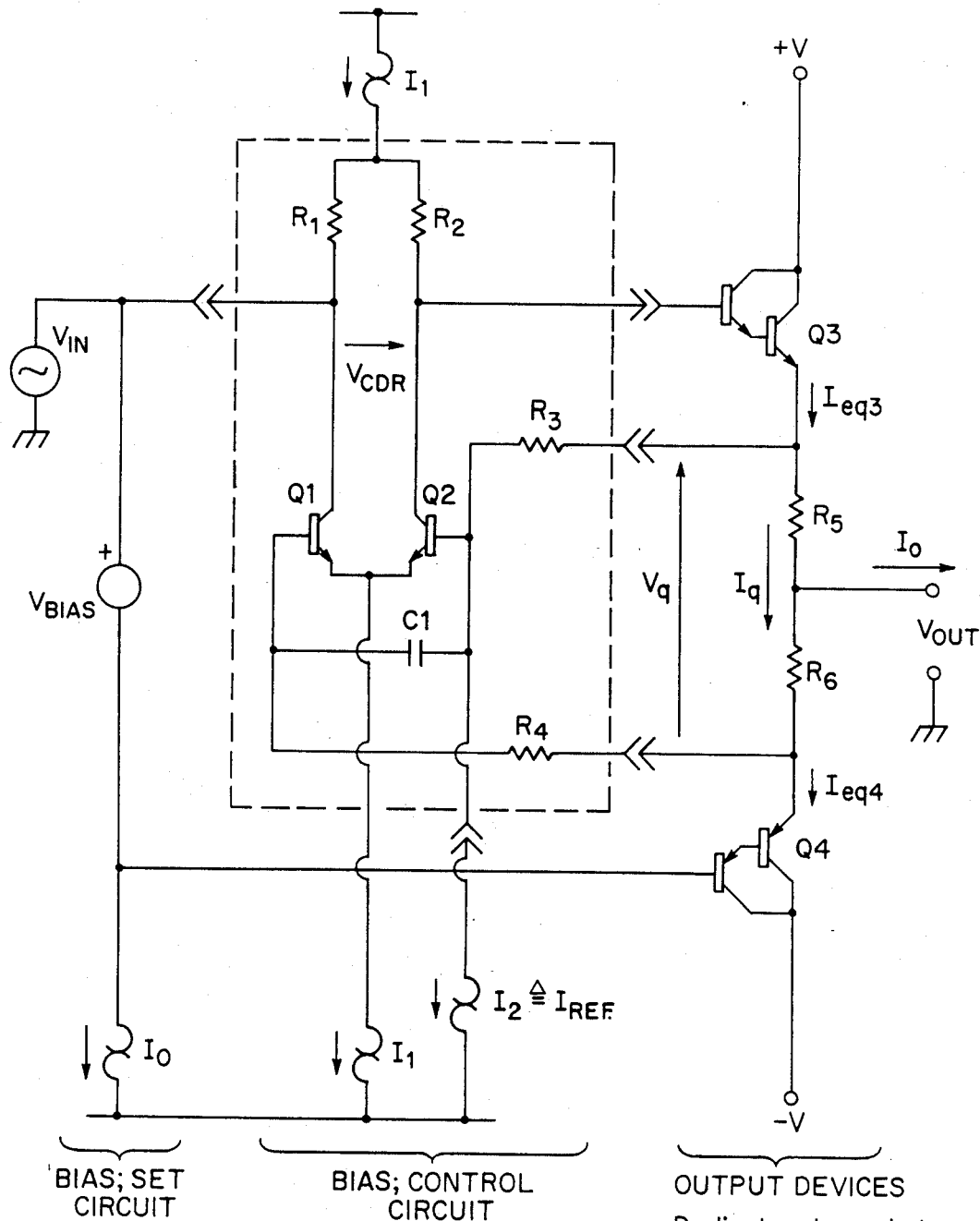
FIG. 7 is a schematic circuit diagram of a biasing arrangement according to the invention.

The present invention represents a solution to the problem. Referring to FIG. 7, there is shown a schematic circuit diagram of circuitry incorporating a biasing arrangement according to the invention. This circuitry comprises transistors Q1, Q2, Q3 and Q4 and associated components. During a no-load current condition, the output stage comprising transistors Q3 and Q4 operates in class A or AB. As the output load current $I_o$ becomes significant, the output stage bias shifts first into class B, and then class C as the output current reaches its maximum value. The maximum dissipation is the same as that for a class C biased stage. Thus, neither the semiconductors nor the cooling system are subjected to additional stress. The only increase in power dissipation occurs when the load requirement is minimum. The power supply must always supply some steady current to reduce the amount of voltage rise. This bias control circuit may also be used to precisely control a class A or AB operation.

Operation is as follows. Assume a quiescent current, $I_q$ flowing through Darlington transistors Q3 and Q4. This current develops a voltage drop, $V_q = I_q(R_5 + R_6)$.

Transistors Q1 and Q2 form a differential input and differential output amplifier. When the voltage drop across resistor R3, $(R_3 \cdot I_2) = V_q$, the input voltage to the amplifier is 0. The voltage across the differential outputs across the collectors of transistors Q1 and Q2 is also 0. When the bias voltage $V_{bias}$ is set equal to $V_q$ plus the two base-to-emitter voltages of output transistors Q3 and Q4, the circuit is in equilibrium. Any changes in either $V_{bias}$ or in the base-to-emitter voltages will be compensated by the gain in the differential amplifier. The output voltage of the amplifier, $V_{cor}$, will adjust itself to keep the current $I_q$ to the value determined by the voltage across resistance R3. When the amplifier delivers an output current $I_o$ to the load, first consider the case where this current is smaller or equal to the quiescent current. If the load current $I_o$ is smaller than the bias current $I_{bias}$, the voltage $V_q$ remains constant, and the amplifier maintains a constant idle current, with or without capacitor C1. Effectively, this is a class A feedback-controlled bias. FIG. 8A shows the emitter currents $I_{eq3}$ and $I_{eq4}$ of transistors Q3 and Q4, respectively, while FIG. 8B shows the output load current $I_o$.

As the load current $I_o$ exceeds the quiescent current $I_q$, the voltage $V_q$ increases. It is convenient to assume that the current is sinusoidal, and that the time constant determined by capacitor C1 and resistors R3 and R4 is large compared to the period of the input signal. The temporary increase in the value of $V_q$ charges capacitor $C_1$. Now the amplifier sees an increase in the quiescent current $I_q$, and the voltage $V_{cor}$ will reduce the bias applied to the output devices. In fact, as the output current $I_o$ increases, the quiescent current $I_q$ continuously decreases. The maximum reduction in the bias voltage, $V_{cor}$, is controlled by the parameter values of the circuit elements. It is relatively easy to reach class C operation.

Without capacitor C1, this circuit maintains control of the quiescent current, $I_q$, even as the load current exceeds the quiescent current. The exemplary embodiment shown in FIG. 7 assumes the use of bipolar output devices. The use of bipolar devices in no way represents a restriction on the usage of this bias control circuit. The output devices could also be MOSFET devices, for example.

Figure 9:
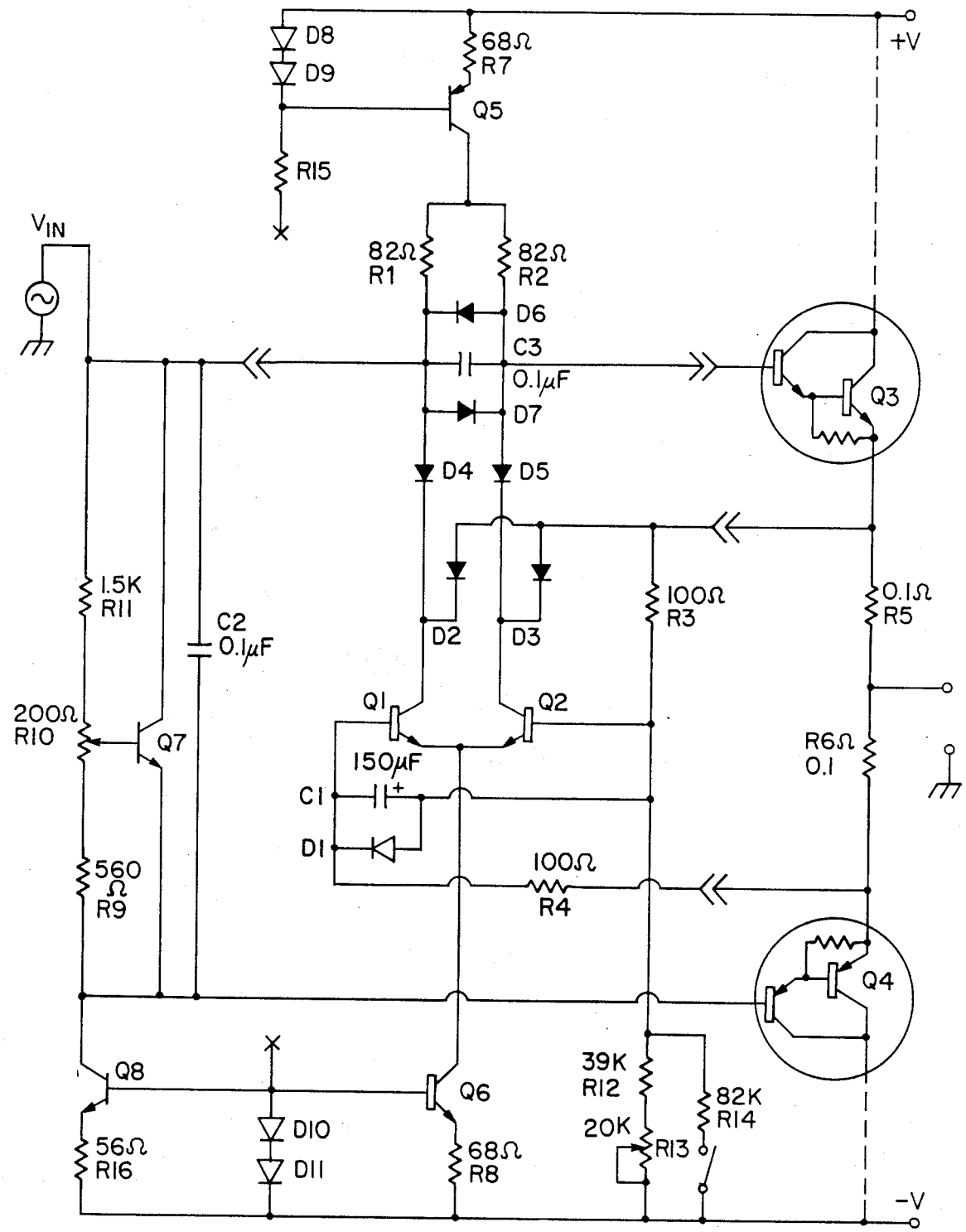
FIG. 9 is a schematic circuit diagram of a preferred form of a biasing arrangement.

Referring to FIG. 9, there is shown a specific circuit arrangement with representative parameter values set forth. This circuitry uses complementary power Darlington bipolar transistors and has a peak output current of 8 amps with a quiescent current of 0.5 or 0.7 amps, a supply voltage of ±50 volts and a signal frequency of 25 Hz to 1 kHz.

In the circuit of FIG. 9 the controlling current source $I_2$ of FIG. 7 is replaced by resistors R12, R13 and R14. For this specific application circuit operation does not change significantly, and the circuitry provides an inexpensive way to switch to different bias currents with an external jumper. The value of the supply voltage now affects the bias current, but this is not a problem in this application. It is important to retain capacitor C1 for this circuit.

The source of the bias voltage $V_{bias}$ comprises transistor Q7 and associated components in a Vbe multiplier circuit. To limit the range of control needed as the temperature changes, transistor Q7 is loosely connected to the heat sink for output transistors Q3 and Q4. For any fast thermal transients, the bias control circuit is in full control of the bias current.

Capacitor C2 and C3 provide direct paths for the input signal to output transistors Q3 and Q4. This coupling arrangement also prevents any high frequency feedback around the bias circuit because capacitor C3, in effect, short circuits the differential outputs of the amplifier.

Diode D1 limits the maximum voltage on capacitor C1 and speeds up the return to the quiescent bias level when the signal is suddenly removed.

Diodes D6 and D7 limit the value of the control voltage $V_{cor}$, to prevent extreme bias conditions in case of a component failure, and also provide a path for short bursts of driving current into the output transistor from the input voltage source.

Diodes D2, D3, D4 and D5 act as gates for the collector current of transistors Q1 and Q2. When one of the output base-to-emitter junctions becomes reverse biased as the output current increases beyond twice the bias current, for example, diodes D4 and D5 are reverse-biased, and the collector current returns to the emitter through diodes D2 and D3. Transistors Q5 and Q6 and resistances R7 and R8, components connected to their bases, act as symmetrical current sources $I_1$ in the circuit of FIG. 7.

The voltage gain of the bias control amplifier is approximately $V_{gain}=(R_1+R_2)/(2\ r_e)$ $r_e=25$ Ohms/$I_e$ (mA)

$I_e=I_1/2=10/2=5$ mA $V_{gain}=(82+82)/(2 * 5)=16.4$

It can be shown that with the bias control circuit, when the junction temperature of transistor Q7 differs from that of transistors Q3 and Q4 by 50° C., the variation in bias current is only 0.125 amp as compared with 2 amps without the control circuit.

Tests performed on the invention have shown that with the bias set at $I_q=0.5$ amps and the case of transistors Q3 and Q4 heated to 100° C., the quiescent current changed to 0.55 amps with the control circuit in and Q7 connected to the heat sink and to 0.70 amps with Q7 not connected to the heat sink. Without a control circuit installed and transistor Q7 not connected to the heat sink, after two minutes of operation, the power was shut down because the circuitry reached a runaway condition when $I_q$ rose to 2.6 amps. These tests demonstrated that the control circuit prevents a thermal runaway condition, even when transistor Q7 is not thermally connected to the output devices.

The control circuit of FIG. 9 was added to an existing class C output stage design and does not represent the best regulation that can be obtained with this circuit. For example, by doubling the value of the current source $I_2$, the gain would also double. This doubling would increase the power dissipation in the current source from 0.5 W to 1 W. The gain can also be increased by using larger value of resistances for resistors R1 and R2. Here the tradeoff is between more gain and a larger impedance between the signal source and the output devices. Using MOSFETs as output devices with a very high input impedance, these resistances could be much larger. Such a change would provide the larger voltage range necessary to deal with the smaller transconductance of MOSFET devices. Transistors can be turned on and off with less than a volt change; it takes a few volts to control a MOSFET. The variable resistances R10 and R13 could be omitted with appropriate adjustment of the serial resistance to reduce cost and the risk of misadjustment. An advantage of including these adjustable resistances is increased versatility, allowing the amplifier assembly to be a building block for use in different products operating at different current levels and capable of accommodating a wide range of semiconductor devices without preselection. This circuitry is used in the commercially available Doble F2000 power amplifier.

Figure 10:
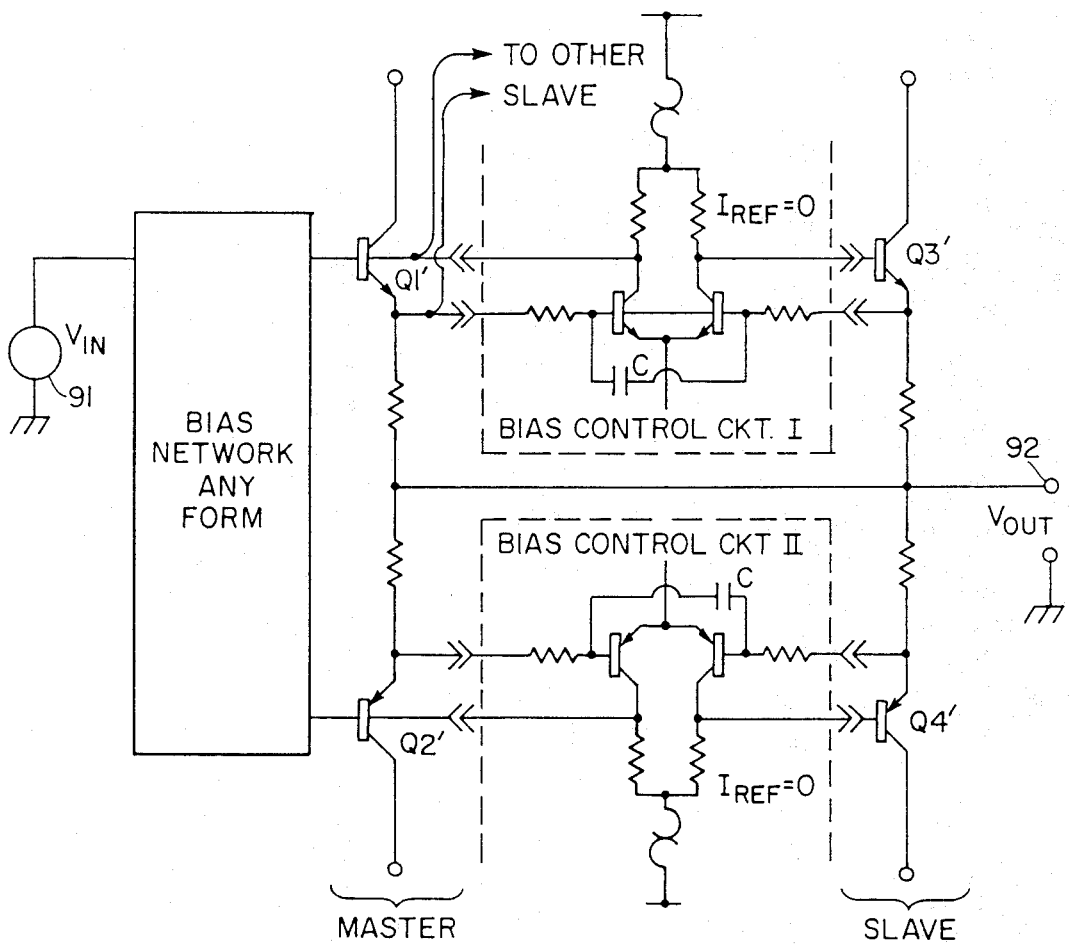
FIG. 10 is a combined block-schematic circuit diagram showing an arrangement fo matching bias of devices operating in parallel.

The invention has a number of other applications. Referring to FIG. 10, there is shown a combined-schematic circuit diagram of an embodiment of the invention for controlling the bias of output devices connected in parallel. The voltage signal in from source 91 is amplified to produce an output $v_{out}$ on output terminal 92. Transistors Q1' and Q2' and associated components form a master amplifier. Transistors Q3' and Q4' and associated circuit components comprise a slave power amplifier. Bias control circuits I and II correspond substantially to those described above in connection with FIGS. 7 and 9 control the bias for transistors Q1' and Q3' and transistors Q2' and Q4', respectively. With capacitor C installed as shown, the average current of each device will be equal. With capacitor C omitted, the instantaneous value of the current in each device will follow the master. This arrangement will make the transconductance of each slave amplifying device equal to that of the master.

Figure 11:
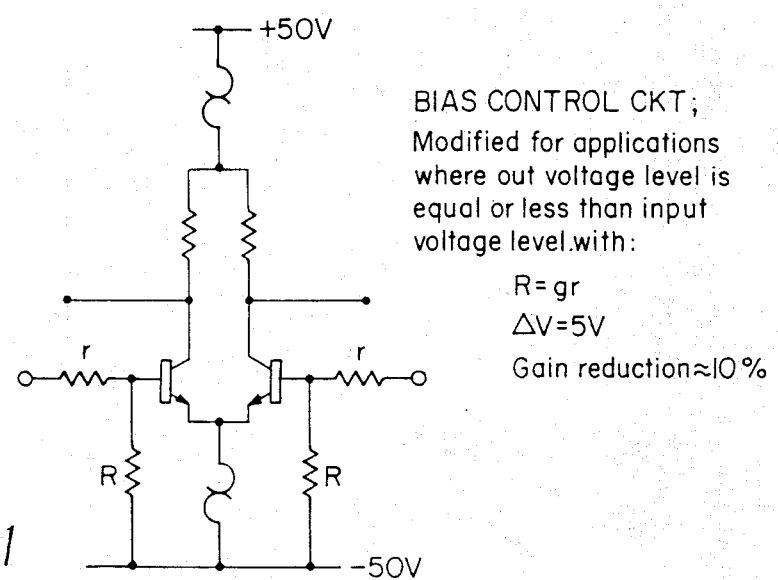
FIG. 11 is a schematic circuit diagram of a modified bias control circuit according to the invention.

Referring to FIG. 11, there is shown a schematic circuit diagram of a bias control circuit according to the invention modified for applications where the output voltage level is equal to or less than the input voltage level with the resistances shunting the base-emitter junction of value R and the resistances in series with each base of value r. With $R=gr$ and $\Delta v_r=5$ v, the gain reduction is about 10%.

Figure 12:
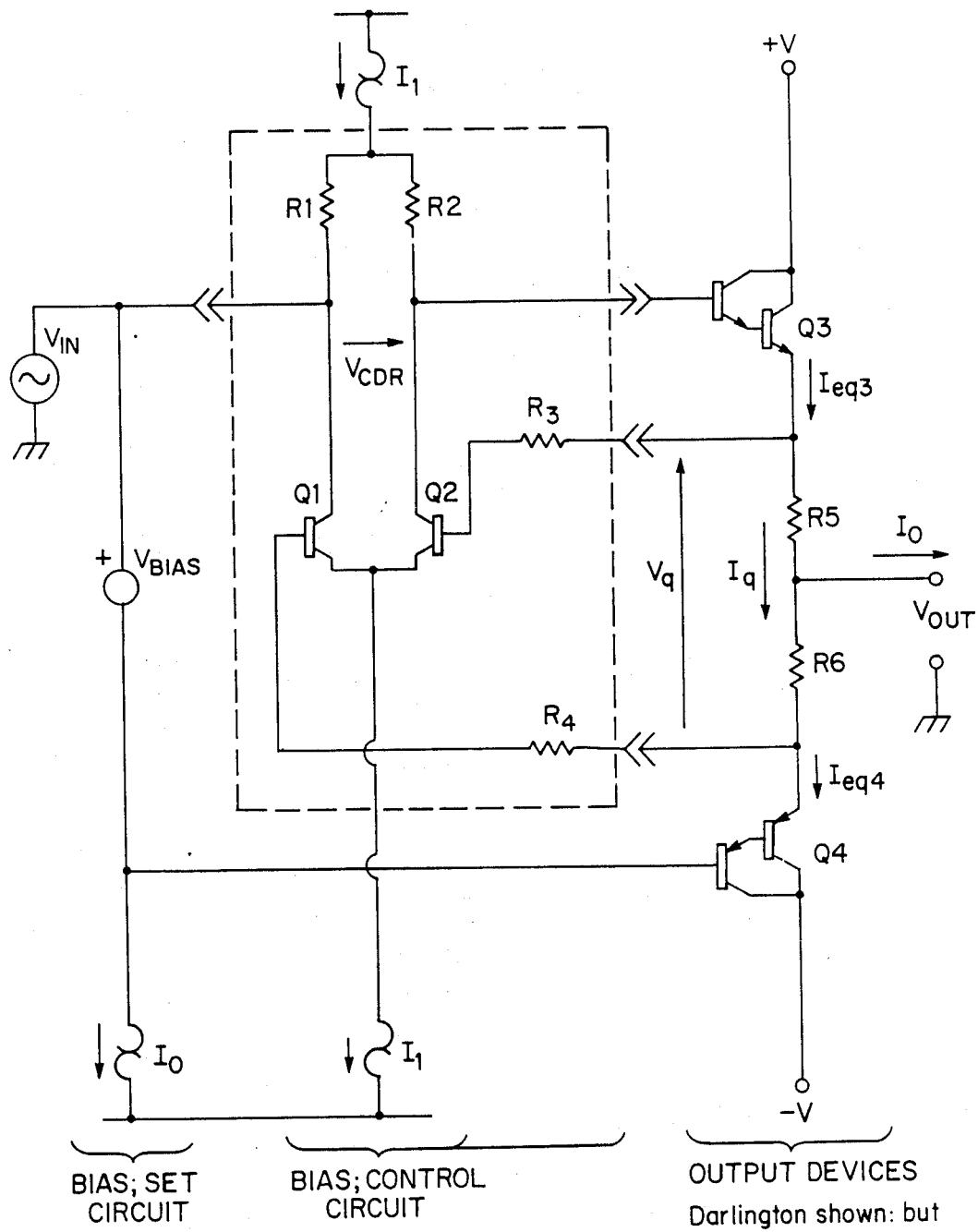
FIG. 12 is a schematic circuit diagram of circuitry for providing bias control for class C operation.

Referring to FIG. 12, there is shown a schematic circuit diagram illustrating how the bias control circuit according to the invention may be used to control the bias when the amplifier comprising transistors Q3 and Q4 are operating class C. While the latter transistors are shown to be Darlington transistors, the output devices could also be power FET or MOSFET devices, for example.

The invention may also be used to control the bias in an amplifier operating class AB with capacitor C1 in the circuit of FIG. 7 removed. In many applications, class AB operation is used to reduce crossover distortion. As the quiescent current increases, the crossover distortion problem is reduced. However, it is important to design a class AB bias with a large bias current with great care to avoid thermal runaway.

Control circuit according to the invention senses directly the instantaneous value of the current, and does not rely on the temperature of some sensor, to provide a correction voltage to output devices. Connecting the bias network to the output devices heat sink facilitates operation over a larger range of conditions, conditions that are very slow to change, such as ambient temperature.

The invention has a number of advantages over the prior art Kepco circuit in Kepco Currents Vol. 1 No. 2 pp. 2–3. The circuit according to the invention is relatively free from complexity, and its behavior, when overdriven, is easier to predict and control with two transistors comparing to a complete operational amplifier. Although the maximum gain possible with the two transistors is limited, it is sufficient to provide the necessary regulation. Furthermore, the gain bandwidth product is much higher than available in most operational amplifiers, typically 30 MHz as compared to 3 MHz. This feature is important in controlling the stability of the circuit. For high frequencies a direct connection may be established between the master and all other devices. Note the paths provides by capacitors C2 and C3 in the circuit of FIG. 9. The invention is relatively low in cost. This arrangement does not need the two auxiliary power supplies that are connected to the output. The two current sources, I1, actually function as floating power sources for the fully differential amplifier.

Referring to FIG. 13, there is shown a combined block-schematic circuit diagram of the commercially available F2200 convertible test system according to the invention. Referring to FIG. 14, there is shown a schematic circuit diagram of the I/V channel of FIG. 13. Those skilled in the art can readily build an exemplary embodiment of the invention with the explanation above and the specific apparatus shown in detail in FIGS. 13 and 14. The commercially available F2200 convertible test system sold by Doble Engineering Company is incorporated by reference herein.

There has been described novel apparatus and techniques for power control. It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Power controlling apparatus comprising,
   an A.C. input for receiving A.C. power,
   diode rectifying means for converting A.C. power received on said A.C. input into D.C. power,
   inductive storage means and a saturable inductor coupling said A.C. input to said diode rectifying means,
   a D.C. output,
   SCR means for coupling said diode rectifying means to said D.C. output,
   said SCR means having a gate electrode,
   a source of a signal representative of the difference between the D.C. potential on said D.C. output and a reference potential for providing an external ramp set point,
   means responsive to said external ramp set point for providing a ramp signal,
   means for comparing said ramp signal with a signal related to the D.C. potential provided by said diode rectifying means to provide a trigger signal when potential of said ramp signal and the diode rectifying means D.C. potential bear a predetermined value,
   and means responsive to said trigger signal for providing a trigger command to said SCR gate to then initiate SCR conduction.

2. Power controlling apparatus in accordance with claim 1 and further comprising,
   a symmetrical amplifier powered by said output D.C. potential receiving D.C. potential $+v$ and $-v$ on $+v$ and $-v$ lines, respectively, first and second balancing resistances of equal value connected between said $+v$ line and said $-v$ line defining a function potential at their junction,
   first and second storage capacitors shunting said first and second balancing resistances respectively,
   first and second switchable resistances of substantially the same value connected to said first and second resistances respectively,
   a reference line at reference potential,
   first and second switching means connected in series between said reference line and said first and second switchable resistances respectively,
   balance sensing means connected between the junction of said first and second balancing resistances and said reference line for providing a fine imbalance signal to said symmetrical power amplifying means for reducing the imbalance,
   comparator means responsive to the signal at the junction between said first and second balancing resistances for providing a switch control signal,
   switch actuating means responsive to said switch control signal for controlling said switching means to reduce said imbalance.

3. Power control apparatus in accordance with claim 2 and further comprising,
   gross imbalance sensing means responsive to the signal on said reference line for providing a gross imbalance signal when the sensed imbalance exceeds a predetermined value for providing a turn-off signal to said SCR means for interrupting the flow of D.C. power to said symmetrical power amplifying means.

4. Power control apparatus in accordance with claim 2 wherein said symmetrical power amplifying means includes isolation means for establishing an isolation barrier having a voltage thereacross,
   said isolation means comprising input and output terminals on opposite sides of said isolation barrier,
   transformer means having a secondary winding, a primary winding and an auxiliary primary winding,
   transformer driver amplifying means for coupling spectral components of a signal on said input terminal above a predetermined break frequency to said main primary winding,
   means for cumulatively combining the signal provided by said auxiliary primary winding with the signal on said input terminal for providing a signal having spectral components predominantly below said predetermined break frequency,
   isolating circuit means for providing the latter spectral components to the output side of said isolation barrier,
   and means for cumulatively combining the latter coupled spectral components with a signal provided by said secondary winding to provide on said output terminal a substantial reproduction of the signal on said input terminal.

5. Power control apparatus in accordance with claim 2 wherein said symmetrical power amplifying means includes first and second semiconductor output devices connected in series between said $+v$ and said $-v$ lines each having at least a pair of electrodes and further comprising,
   biasing control circuit means for establishing the bias across said pair of electrodes,
   said bias control circuit means comprising,
   first and second transistors each having base, emitter and collector electrodes forming a differential amplifier with the emitter electrodes connected together,
   means for direct coupling the base electrodes of said first and second transistors to said first electrodes of said first and second output semiconductor devices respectively,
   and means for direct coupling the collector electrodes of said first and second transistors to said second electrodes of said first and second output semiconductor devices respectively.

6. Power control apparatus in accordance with claim 5 and further comprising a capacitor connected between the base electrodes of said first and second tranistors.

7. Power controlling apparatus comprising,
   a source of D. C. potentials $+v$ and $-v$ on $+v$ and $-v$ lines respectively, a symmetrical amplifier receiving said D. C. potentials +v and −v on said +v and −v lines respectively, first and second balancing resistances of equal value connected between said +v line and −v line defining a function potential at their junction, first and second storage capacitors shunting said first and second balancing resistances respectively, first and second switchable resistances of substantially the same value connected to said first and second resistances respectively, a reference line at reference potential, first and second switching means connected in series between said reference line and said first and second switchable resistances respectively, balance sensing means connected between the junction of said first and second balancing resistances and said reference line for providing a fine imbalance signal to said symmetrical amplifier for reducing the imbalance, comparator means responsive to the signal at the junction between said first and second balancing resistances for providing a switch control signal, and switch actuating means responsive to said switch control signal for controlling said switching means to reduce said imbalance.

8. Power control apparatus in accordance with claim 7 and further comprising, gross imbalance sensing means responsive to the signal on said reference line for providing a gross imbalance signal when the sensed imbalance exceeds a predetermined value for providing a turn-off signal, and means responsive to said turn-off signal for interrupting the flow of D. C. power to said symmetrical amplifier.

9. Power control apparatus in accordance with claim 7 wherein said symmetrical amplifier includes isolation means for establishing an isolation barrier having a voltage thereacross, said isolation means comprising input and output terminals on opposite sides of said isolation barrier, transformer means having a secondary winding, a primary winding and an auxiliary primary winding, transformer driver amplifying means for coupling spectral components of a signal on said input terminal above a predetermined break frequency to said main primary winding, means for cumulatively combining the signal provided by said auxiliary primary winding with the signal on said input terminal for providing a signal having spectral components predominantly below said predetermined break frequency, isolating circuit means for providing the latter spectral components to the output side of said isolation barrier, and means for cumulatively combining the latter coupled spectral components with a signal provided by said secondary winding to provide on said output terminal a substantial reproduction of the signal on said input terminal.

10. A circuit for establishing an isolation barrier having a voltage thereacross comprising, input and output terminals on opposite sides of said isolation barrier, transformer means having a secondary winding, a primary winding and an auxiliary primary winding, transformer driver amplifying means for coupling spectral components of a signal on said input terminal above a predetermined break frequency to said main primary winding, means for cumulatively combining the signal provided by said auxiliary primary winding with the signal on said input terminal for providing a signal having spectral components predominantly below said predetermined break frequency, isolating circuit means for providing the latter spectral components to the output side of said isolation barrier, and means for cumulatively combining the latter coupled spectral components with a signal provided by said secondary winding to provide on said output terminal a substantial reproduction of the signal on said input terminal.

11. Power control apparatus in accordance with claim 7 wherein said symmetrical amplifier includes first and second semiconductor output devices connected in series between said +v and said −v lines each having at least a pair of electrodes and further comprising, biasing control circuit means for establishing the bias across said pair of electrodes, said bias control circuit means comprising, first and second transistors each having base, emitter and collector electrodes forming a differential amplifier with the emitter electrodes connected together, means for direct coupling the base electrodes of said first and second transistors to said first electrodes of said first and second output semiconductor devices respectively, and means for direct coupling the collector electrodes of said first and second transistors to said second electrodes of said first and second output semiconductor devices respectively.

12. Power control apparatus in accordance with claim 11 and further comprising a capacitor connected between the base electrodes of said first and second transistors.

13. A symmetrical amplifier comprising, a source of D. C. potentials +v and −v on +v and −v lines respectively, first and second semiconductor output devices connected in series between said +v and said −v lines each having at least a pair of electrodes, biasing control circuit means for establishing the bias across said pair of electrodes, said bias control circuit means comprising, first and second transistors each having base, emitter and collector electrodes forming a differential amplifier with the emitter electrodes connected together, means for direct coupling the base electrodes of said first and second transistors to said first electrodes of said first and second output semiconductor devices respectively, and means for direct coupling the collector electrodes of said first and second transistors to said second electrodes of said first and second output semiconductor devices respectively.

14. Power control apparatus in accordance with claim 13 and further comprising a capacitor connected between the base electrodes of said first and second transistors.

* * * * *